(12) United States Patent
Jensen

(10) Patent No.: US 11,147,203 B2
(45) Date of Patent: Oct. 19, 2021

(54) MIDDLE MOUNTED IMPLEMENT TRACTOR

(71) Applicant: Philip Jensen, Fowler, CO (US)

(72) Inventor: Philip Jensen, Fowler, CO (US)

( * ) Notice: Subject to any disclaimer, the term of this patent is extended or adjusted under 35 U.S.C. 154(b) by 0 days.

(21) Appl. No.: 15/900,792

(22) Filed: Feb. 20, 2018

(65) Prior Publication Data
US 2020/0146197 A1 May 14, 2020

Related U.S. Application Data

(63) Continuation-in-part of application No. 14/294,129, filed on Jun. 2, 2014, now Pat. No. 9,894,825.

(51) Int. Cl.
*A01B 51/02* (2006.01)
*A01B 59/06* (2006.01)
*B62D 49/06* (2006.01)
*B65G 69/28* (2006.01)

(52) U.S. Cl.
CPC .......... *A01B 51/023* (2013.01); *A01B 51/026* (2013.01); *A01B 59/062* (2013.01); *B62D 49/065* (2013.01); *B62D 49/0678* (2013.01); *B65G 69/28* (2013.01)

(58) Field of Classification Search
CPC .............. B62D 49/0607; B62D 49/065; B62D 49/0678; E02F 3/7668; A01B 51/026; A01B 51/00; A01B 51/02; A01B 51/023; A01B 59/062; A01L 351/00; A01L 351/02; A01L 351/026; A01L 351/023; B65G 69/28

USPC ....... 172/273, 297–309, 312, 780, 781, 788, 172/789, 795
See application file for complete search history.

(56) References Cited

U.S. PATENT DOCUMENTS

| | | | | |
|---|---|---|---|---|
| 3,027,662 A | * | 4/1962 | Cunningham, Jr. .......... | 172/815 |
| 3,207,233 A | * | 9/1965 | Shumaker .............. | A01B 63/22 172/316 |
| 3,874,469 A | * | 4/1975 | Sjovall ............... | B62D 49/0607 180/12 |
| 3,876,023 A | * | 4/1975 | Hushower ............ | B62D 49/007 180/14.1 |
| 3,889,976 A | * | 6/1975 | Jesswein ............... | E02F 9/0841 280/400 |
| 4,213,507 A | * | 7/1980 | Horrer et al. ................. | 172/784 |

(Continued)

FOREIGN PATENT DOCUMENTS

WO WO-0123241 A2 * 4/2001 ........... A01B 51/023

*Primary Examiner* — Adam J Behrens

(57) ABSTRACT

A middle mounted implement tractor utilizes a movable frame design in order to provide for middle mounting of implements on a tractor that can drive up to the implement, raise its front portion in the air, drive forward over the implement, and then lower the front portion to the ground and attach the middle mounted implement. This is accomplished utilizing a front frame assembly pivotably connected to a mounting frame assembly which mounts the implement; a frame mover mechanism that lifts the front frame and mounting frame; a middle frame which connects the cab, frame mover mechanism and related components; and a rear frame which attaches rear wheels, caster wheels, engine, etc. The front wheels can turn one hundred and eighty degrees and the tractor can easily interchange consumables via a carriage system that allows simple loading and unloading of tanks, etc.

20 Claims, 38 Drawing Sheets

(56) References Cited

U.S. PATENT DOCUMENTS

| | | | | |
|---|---|---|---|---|
| 4,635,730 A * | 1/1987 | Larsson | .................. | E02F 3/764 |
| | | | | 172/788 |
| 4,679,634 A * | 7/1987 | Bulmahn | ............. | A01B 59/044 |
| | | | | 172/250 |
| 4,693,331 A * | 9/1987 | Johnson | ............... | A01B 51/026 |
| | | | | 172/292 |
| 5,105,608 A * | 4/1992 | Knez | .................... | A01B 51/026 |
| | | | | 56/328.1 |
| 6,764,270 B1 * | 7/2004 | Bernhardt | ............ | A01B 51/026 |
| | | | | 414/685 |
| 7,021,720 B1 * | 4/2006 | Yeggy | .................. | A01B 51/026 |
| | | | | 180/16 |
| 7,658,236 B2 * | 2/2010 | Howson | ................ | E02F 3/3604 |
| | | | | 172/780 |
| 10,086,868 B1 * | 10/2018 | Brooks | .................. | B62D 7/142 |
| 2002/0084085 A1 * | 7/2002 | Pellenc | ............. | B62D 49/0607 |
| | | | | 172/762 |
| 2017/0274704 A1 * | 9/2017 | Fay, II | ............... | B62D 49/0678 |
| 2017/0290258 A1 * | 10/2017 | Mollick | ............... | A01B 59/002 |
| 2019/0141884 A1 * | 5/2019 | Pilney | ................ | A01M 7/0082 |
| | | | | 180/209 |

* cited by examiner

MIDDLE MOUNTED IMPLEMENT TRACTOR

CROSS-REFERENCE TO RELATED APPLICATIONS

This application claims the benefit of U.S. patent application Ser. No. 14/294,129 filed on Jun. 2, 2014 and entitled MIDDLE MOUNTED IMPLEMENT TRACTOR, and any related applications cited thereby, which are specifically incorporated by reference herein for all that they disclose and teach.

TECHNICAL FIELD

The present invention relates generally to the field of agricultural equipment; more particularly, to the field of tractors; and, more particularly still, to a tractor having a middle implement mount.

BACKGROUND

Since the early days of agriculture, farmers have toiled to increase their productivity and the amount of crops they can produce. Although there have been many major improvements along the way, perhaps one of the most significant has been the development of the tractor. This multi-function machine has freed farmers from the limitations of horses, oxen, etc., and greatly increased the productivity of farmers.

Over time, tractors gradually replaced horses and oxen for pulling agricultural machines or "implements" through the fields. Most such implements where initially "rear-mounted" as it was much easier for a horse or ox to pull, rather than push, a machine through the field, and so tractors initially pulled such rear-mounted implements as well. However, as tractors—and the agricultural equipment industry as a whole—developed, it became apparent that implements no longer had to remain rear-mounted. Ingenious new designs appeared that allowed implements to be mounted to the front of a tractor and be effectively "pushed" through the fields. Although such mounting means can still be found, others chose to mount implements in a middle or "belly" configuration in which the implement is located between the front and rear wheels of the tractor. This middle mounting has the same primary advantage that front mounting had over rear mounting: the operator or driver of the tractor can view the implement working the field; make adjustments immediately as they are needed; and, at the same time, he can see the upcoming features of the field ahead. With a rear mounted implement, the driver can either view the upcoming field or can turn around and watch the implement. Additionally, middle mounting avoids some of the problems of front mounting, namely: gauge wheels on the implement are not necessary, better depth (or height) control can be achieved, the weight of the implement and implement-workforces are more evenly distributed between the front and rear tractor wheels, and a middle mounting tractor can get the implement closer to ditch banks or fences when pulling forward to them or when backing up to them and pulling away.

Although a number of middle mounting systems exist in the art, they have limitations and deficiencies that have caused such systems to remain niche applications with the vast majority of tractors and implements utilizing the rear and/or front mounting systems. For example, one major deficiency present in the art is that there is no easy way to change middle mounted implements. Such implements can be disconnected from a tractor, but then have to be slid to the left or right of the tractor in order to avoid the tractor's wheels. Similarly, to attach a new implement, the implement has to be slid into place from the side. As implements can often be big, bulky, heavy, generally unwieldy and difficult to move, this has been a serious limitation in the art. What is needed is a tractor that can be driven directly into position over a middle mounted implement, thereby removing the need to slide the implement into position under the tractor.

Another need that this invention addresses is that of a tractor designed to carry one or more material tanks so that an operator may apply bulk seed, pesticides, or fertilizer while using various implements. Currently available farm tractors are good at carrying or pulling farm implements, but tanks must be "added on" in the form of saddle tanks and front or rear extended tanks. Alternatively, many currently available self-propelled sprayers do have tanks inherently built into their design, but theses vehicles do not have the capability to use implements. The current invention has embodiments that can accomplish either or both: easily loading and unloading of a plurality of consumables carriages for handling material tank(s), while also having the ability to handle a variety of implements in a middle mounted fashion while providing for simply and easy mounting/unmounting.

DETAILED DESCRIPTION

Figure 1:
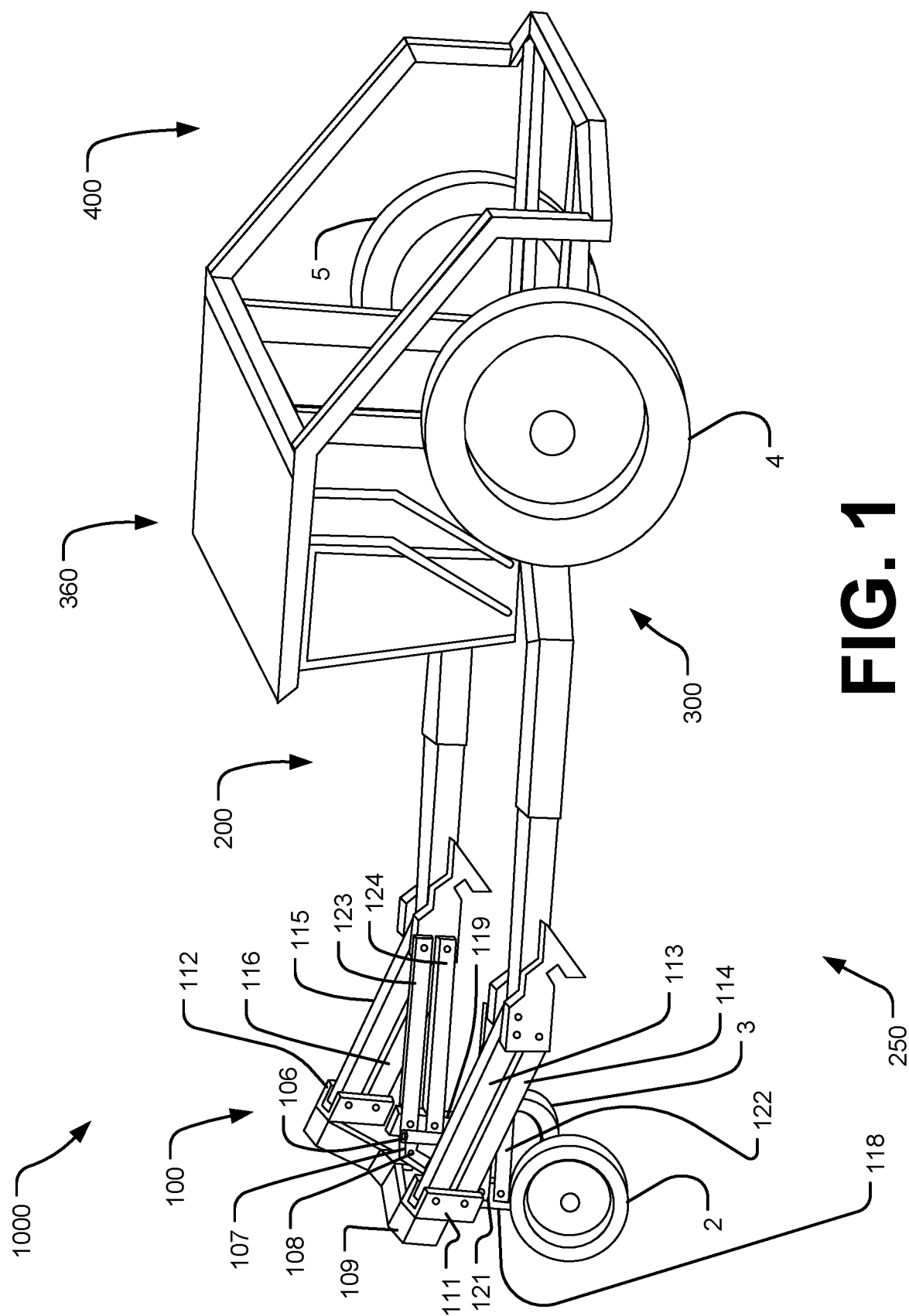
FIG. 1 illustrates a perspective view of an exemplary embodiment of a middle mounted implement tractor, highlighting the frame assemblies.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a perspective view of an exemplary embodiment of a middle mounted implement tractor 1000, highlighting the frame assemblies: the front frame assembly 100, the mounting frame assembly 200, the middle frame assembly 300, and the rear frame assembly 400. The front frame assembly 100 and the mounting frame assembly 200 together comprise the movable frame assembly 250.

The front frame assembly 100 comprises the fixed forward frame assembly and associated frame components: the front wheel assembly, two sets of parallel pivoting arms, and the first and second front wheels 2 and 3. The front wheel assembly pivots on a pivot point 108 at the center of the width of the machine. This pivot point 108 allows the front axle to "float" side to side, meaning the right tire 3 can travel vertically up or down over uneven ground while the left tire 2 can travel the opposite way, thus allowing the tractor to maintain all four main wheels on the ground while traversing rough terrain.

Two sets of parallel pivoting arms on each side of the tractor connect the front frame assembly 100 to the mounting frame assembly 200. The first set on each side are called the W arms. On the left side are the first top W arm 113 and the first bottom W arm 114, and on the right side are the second top W arm 115 and the second bottom W arm 116. These arms are responsible for bearing the weight of the movable frame assembly 250 when in the lowered, wheel-down position and they also serve as the connecting point for the hydraulic cylinders (not shown in FIG. 1) which raise and lower the front frame assembly 100 relative to the mounting frame assembly 200.

The second sets of parallel pivoting arms on each side of the tractor are called the stabilizing arms, or "S" arms. On the left side are the first top S arm 121 and the first bottom S arm 122, and on the right side are the second top S arm 123 and the second bottom S arm 124. These S arms 121, 122, 123, and 124 provide strength and support for the pivotal axle frame 107 and wheel knees 105 and 106 (105 is not visible in FIG. 1, see FIG. 4). The S arms are not designed to carry the weight of the tractor; instead, they work to keep the wheel knees 105 and 106 vertical and counteract any rearwards force experienced by the knees 105 and 106. The connections between the S arms and the knees need to be able to pivot; thus, a ball joint, or other multi-axis pivot, is preferred between these components. The S arms and many other components can be attached using pins or any other suitable connector(s).

The fixed forward frame assembly 109 is located near the very front of the tractor, above the axle frame 107 and attached to it at the pivot point 108. It extends laterally to either side of the pivot point 108 and upwards to first and second Weight-bearing arms, or "W" arms, attachment devises 111 and 112. Each W arm attachment clevis 111 and 112 locates two pivot points for the forward end of a pair of parallel pivoting W arms 113/114 and 115/116. The W arms are responsible for bearing the weight of the front portion of the movable frame 250 and any implement attached thereto. A secondary responsibility of the W arms is to maintain the stability of the fixed forward frame assembly 109.

The second set of parallel arms, the S arms, in conjunction with the pivotal point 108 maintains the strength and position of the axle frame 107 and the knees 105 and 106. The knees connect to the spindles and ultimately the front wheels 2 and 3. By using parallel S arms that pivot at their forward and rearward ends, the front axle will float side-to-side about the center pivot point 108. One purpose of these arms is to provide strength members when the tractor is moved forward or backward. For example, as the tractor is moving forward and the operator turns the steering wheel sharply to the right or left without simultaneously applying the necessary amount of individual rear wheel brake, the tractor, instead of turning may tend to go forward with the front tires "plowing" or skidding. Of course, simply applying an appropriate rear brake (left rear if turning left, right rear if turning right) during the turn will cause the front end to turn with the front tires carving the turn in the desired direction. Without the S arms, when plowing occurs during a turn, a large amount of force is applied to the knees 105 and 106, axle frame 107, pivot point 108, and onwards through the front frame assembly 100 to the devises 111 and 112, the W arms, and back to the movable frame assembly 250. By including the S arms, the same force that occurs during a plowing episode will travel directly from the knees 105 and 106 to the movable frame assembly 250, eliminating all the stresses on the other parts mentioned above.

Figure 4:
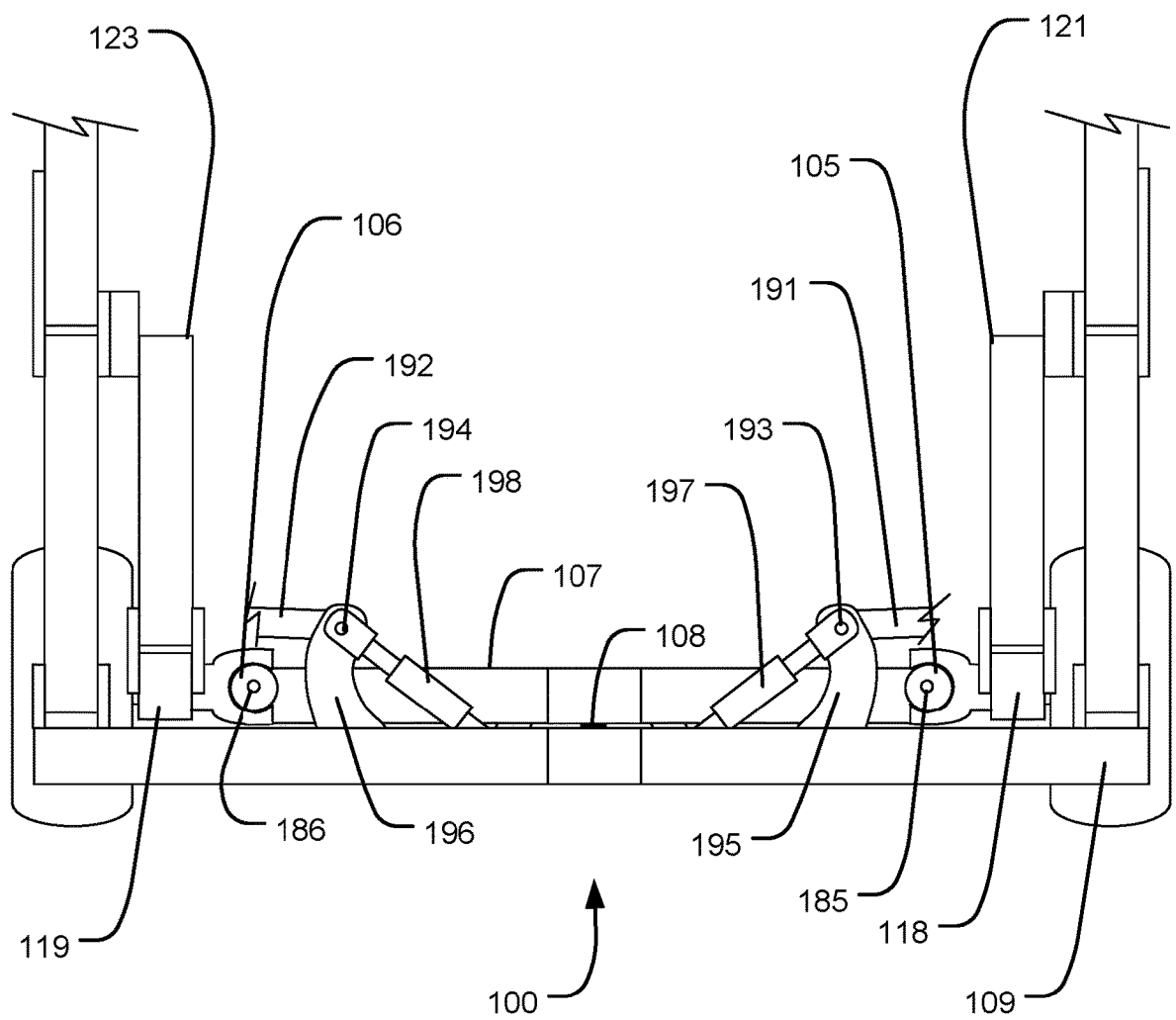
FIG. 4 illustrates a top plan view of an exemplary embodiment of a middle mounted implement tractor, highlighting the front wheel assembly.

The forward ends of the S arms are pivotally connected to vertical extensions 118 and 119, which are attached to the knees 105 and 106, respectively (see also FIG. 4). The S arms are located just to the inside of the W arms on both the left and right sides of the tractor. It is important to note that the vertical extensions 118 and 119 of the knees 105 and 106 are located to the outside of the steering bell cranks 189 and 190, respectively (see FIG. 5), so as not to interfere with the steering mechanism. The rear of each S arm is pivotally connected to the mounting frame assembly 200 using pins that allow each S arm to pivot up and down. These same pivot pins can be used to mount the W arms to the mounting frame assembly 200 as well.

The mounting frame 200 comprises the attachment mounts for the middle mounted implements, extendable frame components, and movable frame assemblies. The middle frame 300 comprises the vertical frame attachment components for the movable frame assemblies and associated frame components that tie the cab 360, rear wheels 4 and 5, and rear frame 400 to the movable frame 250.

Figure 2:
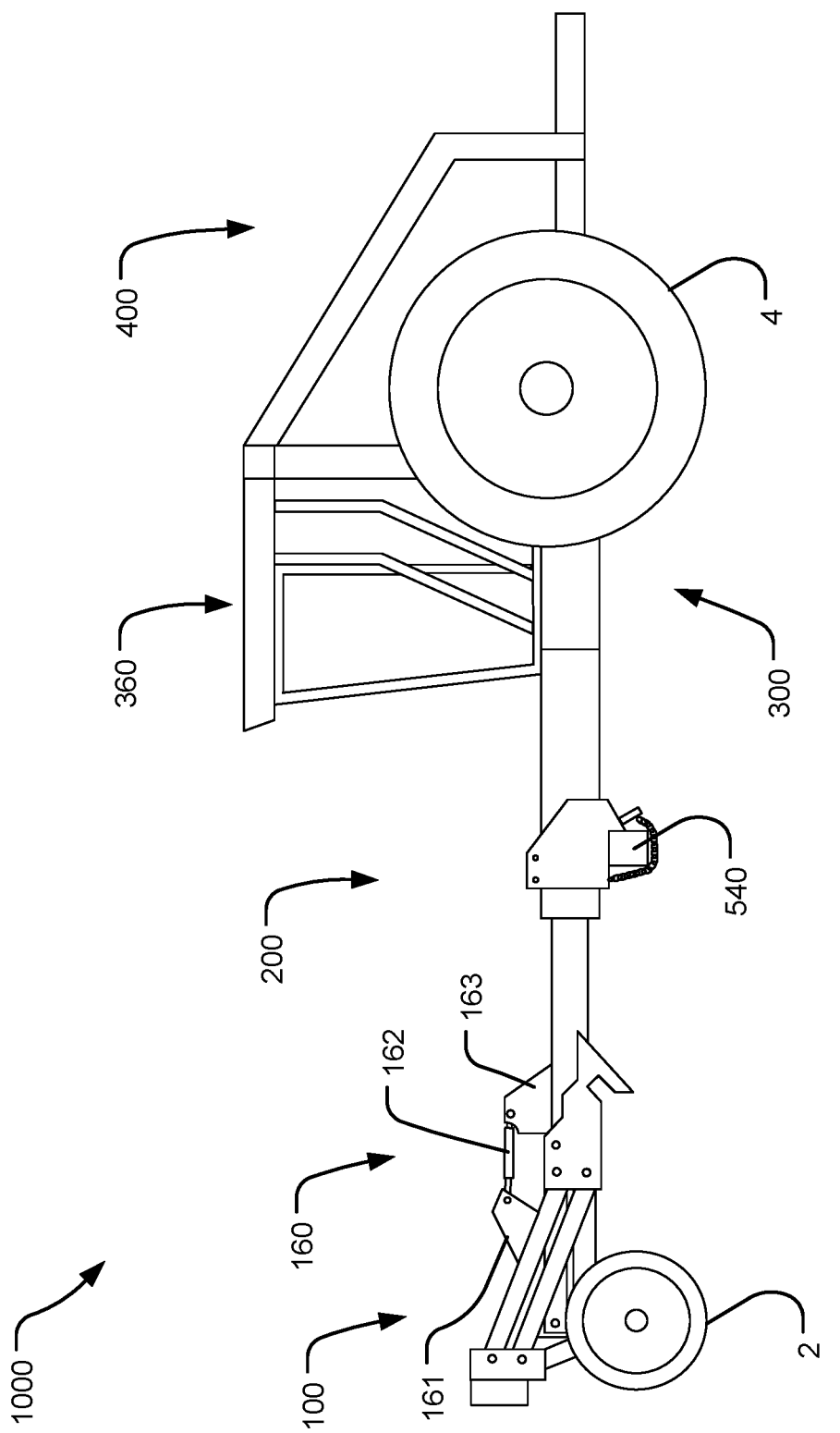
FIG. 2 illustrates a left side elevation view of an exemplary embodiment of a middle mounted implement tractor, highlighting the frame assemblies and an implement connection bar with a movable frame in a lowered, wheels-down position.

FIG. 2 illustrates a left side elevation view of an exemplary embodiment of a middle mounted implement tractor 1000, highlighting the frame assemblies 100, 200, 250, 300, and 400 and an implement connection bar 540 with a movable frame assembly 250 in a lowered, wheels-down position. Notice that the bottom portion of the front wheel 2 is at approximately the same ground level as the bottom portion of the rear wheel 4. Because of the pivoting mounting pins connecting the W arms and S arms to the mounting frame assembly 200, the front wheels hydraulic lift system 160 can raise or lower the front wheels 2 and 3 to: (i) adjust the angle at which the entire tractor rides relative to the ground, or (ii) account for the raising or lowering of the entire movable frame assembly 250. The front wheels hydraulic lift system 160 comprises a front frame assembly connector 161, a mounting frame assembly connector 163, and a front wheels lift hydraulic cylinder 162 therebetween. In other embodiments, a second front wheels hydraulic lift system is employed in tandem with the first 160 on the right side of the tractor 1000.

Figure 3:
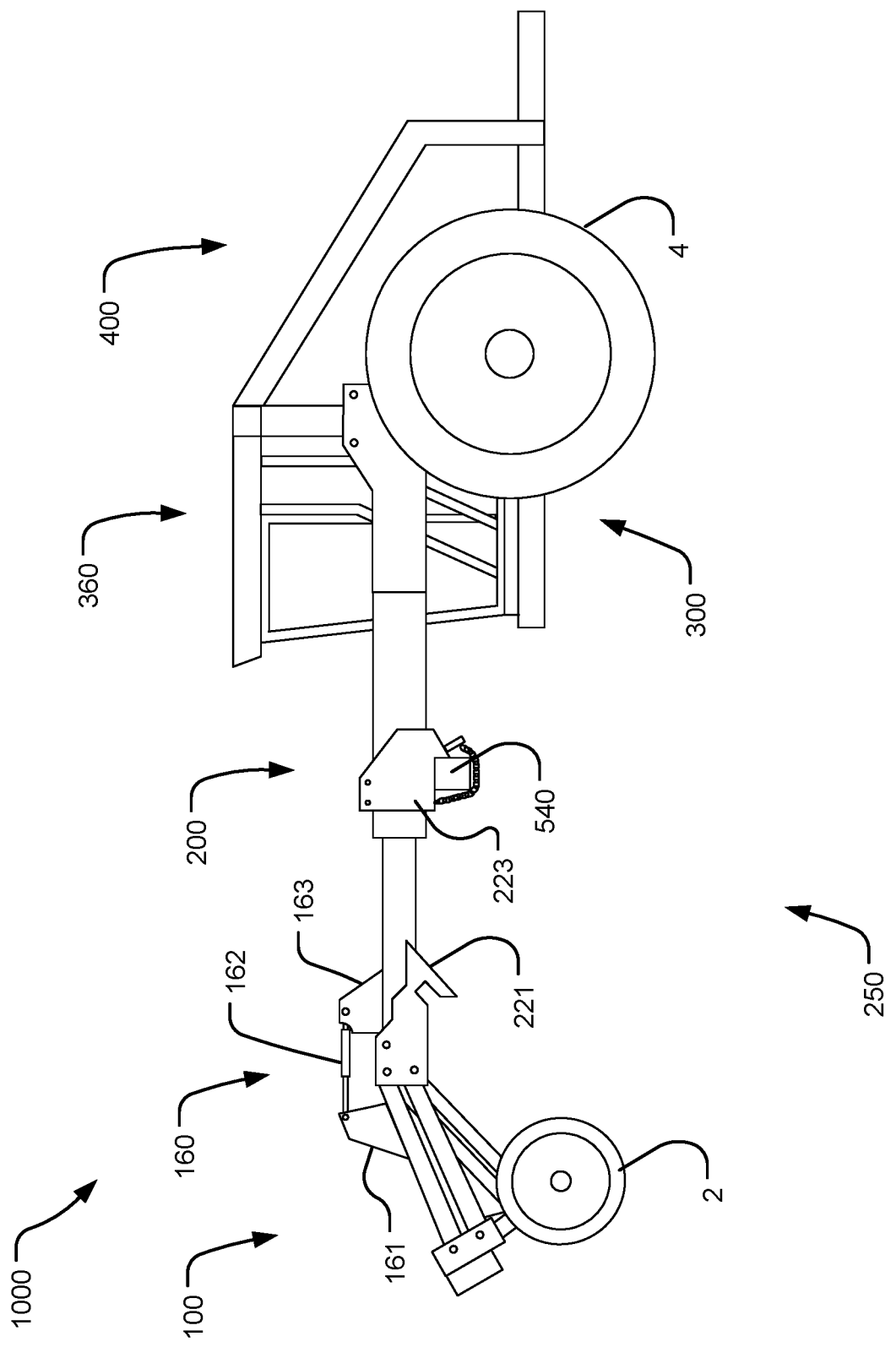
FIG. 3 illustrates a left side elevation view of an exemplary embodiment of a middle mounted implement tractor, highlighting the frame assemblies and an implement connection bar with a movable frame in a raised, wheels-down position.

FIG. 3 illustrates a left side elevation view of an exemplary embodiment of a middle mounted implement tractor, highlighting the frame assemblies 100, 200, 250, 300, and 400 and an implement connection bar 540 with a movable frame in a raised, wheels-down position. By comparing FIGS. 2 and 3, it should be apparent that one of the features of the instant invention is that the tractor operator can easily control how high the movable frame assembly is positioned relative to the ground. Thus, if a particular implement is taller than another implement, the operator can adjust the tractor to handle either implement simply by raising or lowering the movable frame assembly 250 and then raising or lowering the front wheel assembly 100 accordingly.

Also shown in FIG. 3 are the first implement attachment point 221 and the second implement attachment point 223. On the other side of the tractor are corresponding third and fourth attachment points. See FIGS. 9A and 9B as well as FIGS. 7A-B and 8A-B for more information concerning implement attachment.

FIG. 4 illustrates a top plan view of an exemplary embodiment of a middle mounted implement tractor 1000, highlighting the front wheel assembly 100. The steering is designed to pivot the front wheels 2 and 3 a full ninety degrees to the left and right (one hundred and eighty degrees total); this motion can be powered by first and second hydraulic cylinders 197 and 198 located on both sides. In another embodiment, a single cylinder powers both sides. In yet another embodiment, a motive source besides hydraulics is used. On the machine's left is the first steering hydraulic cylinder 197; it is connected to a first idler arm 195 (a second steering hydraulic cylinder 198, and a second idler arm 196 are mirrored on the right side). The idler arms 195 and 196 are connected to a first and second link 191 and 192 at a steering pivot point 193 and 194, respectively. The first and second links 191 and 192 are connected at their other ends to a first and second bell cranks 189 and 190 (see FIG. 5) using a first and second knee pivot point 187 and 188 (see FIG. 5). Each bell crank 189 and 190 sits atop a rotating shaft 185 and 186, respectively, that are each attached to the front spindles 104 and 103 (see FIG. 25 for a view of 104; 103 is the spindle on the opposite side).

Figure 25:
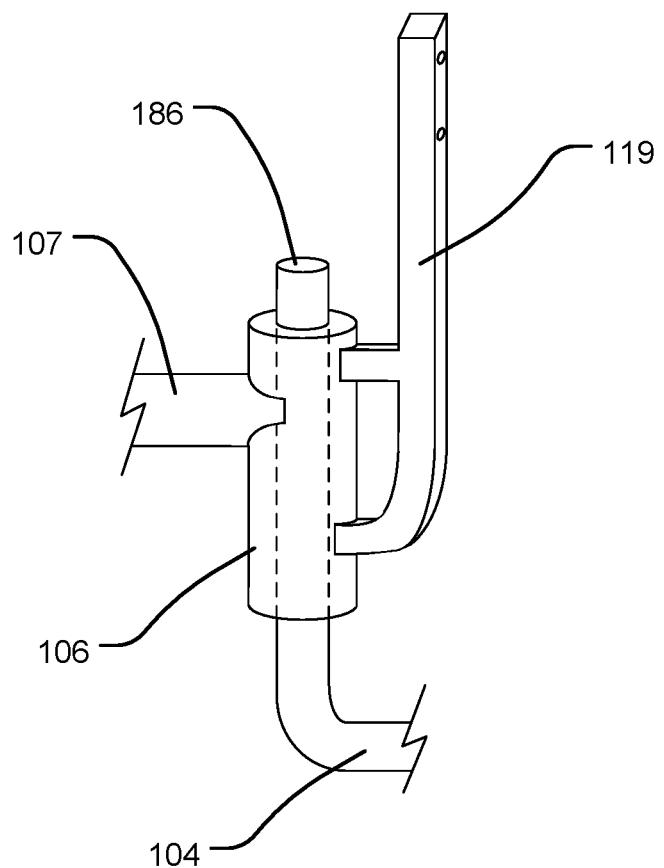
FIG. 25 illustrates a rear perspective view of an exemplary embodiment of a front, right side knee assembly for a front wheel.

FIG. 25 illustrates a perspective view from the rear showing the front right knee assembly. As can be seen in close-up in FIG. 25, the rotating shaft 186 fits within the wheel knee 106. The pivotal axle frame 107 is attached to the wheel knee 106 as is the vertical extension 119. The rotating shaft 186 can turn within the wheel knee 106. Since the spindle 104 is attached to the rotating shaft 186, it should be clear that by turning the shaft 186, the operator also rotates the spindle 104. And as the spindle 104 is attached to the front wheel 3, the wheel 3 is consequently turned as well.

When the first and second steering hydraulic cylinders are actuated (they operate oppositely: when one pushes out, the other retracts in, and vice-versa), they operate on their respective front wheel assembly 100 components in order to turn the front wheels. In one embodiment, the components are adjusted so that when a wheel is the inside wheel of a turn, it has a slightly tighter turn radius than the outer wheel and vice-versa.

The front wheels may be powered, either hydraulically or otherwise, to provide front wheel drive and/or all wheel drive. In one embodiment, hydraulic motors using planetary gears are emplaced within both front wheel housings and hydraulic lines running to each wheel provide power. The fixed forward frame assembly can have grill work, lights, etc. on the front and may have provisions for one or more saddles for additional sprayer tanks and/or other items. In another embodiment, extendable axels or spindles can be incorporated into the front wheels to increase or decrease the distance between the front wheels. Furthermore, the front frame assembly 100 and any cross frame members in the other frame assemblies 200, 250, 300 and 400 could be constructed using telescoping components or sliding components such that the overall width of the tractor 1000 could be increased or decreased as desired. Similarly, in another embodiment, the pivotal axle frame 107 could be split into two components, each having its own pivot point 108, and each component mounted to one half of a similarly split forward frame assembly 109 and then these two halves of the front assembly could be drawn together or expanded by the use of hydraulics or other means.

Figure 5:
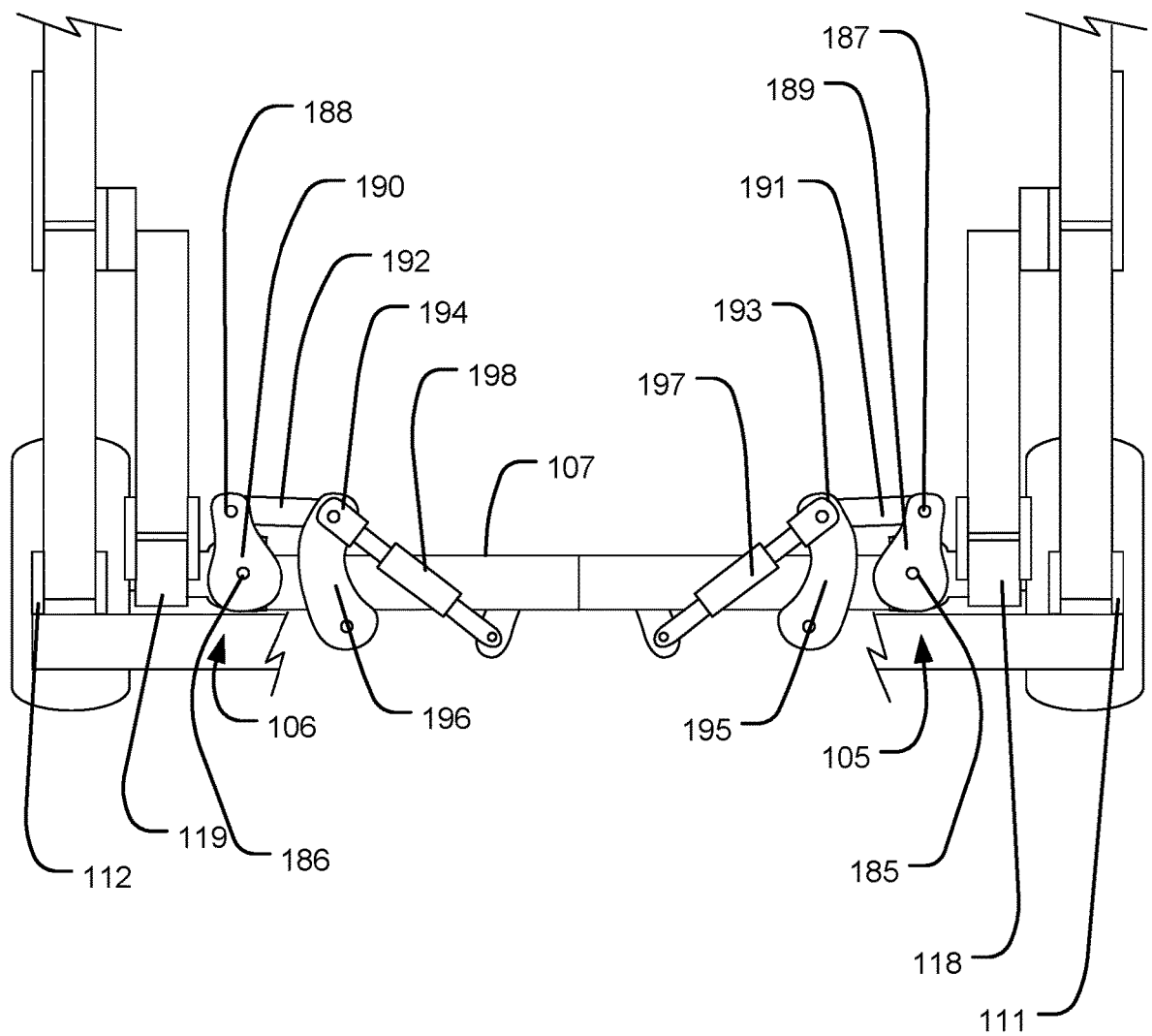
FIG. 5 illustrates a top plan view of an exemplary embodiment of a middle mounted implement tractor, highlighting the front wheel assembly.

FIG. 5 illustrates a top plan view of an exemplary embodiment of a middle mounted implement tractor 1000, highlighting the front wheel assembly. This view highlights a few different components from FIG. 4, specifically: the first and second links 191 and 192 are connected at their other ends to first and second bell cranks 189 and 190 using first and second knee pivot points 187 and 188. Each bell crank 189 and 190 sits atop a rotating shaft 185 and 186, respectively, that are each attached to the front spindles.

Figure 6:
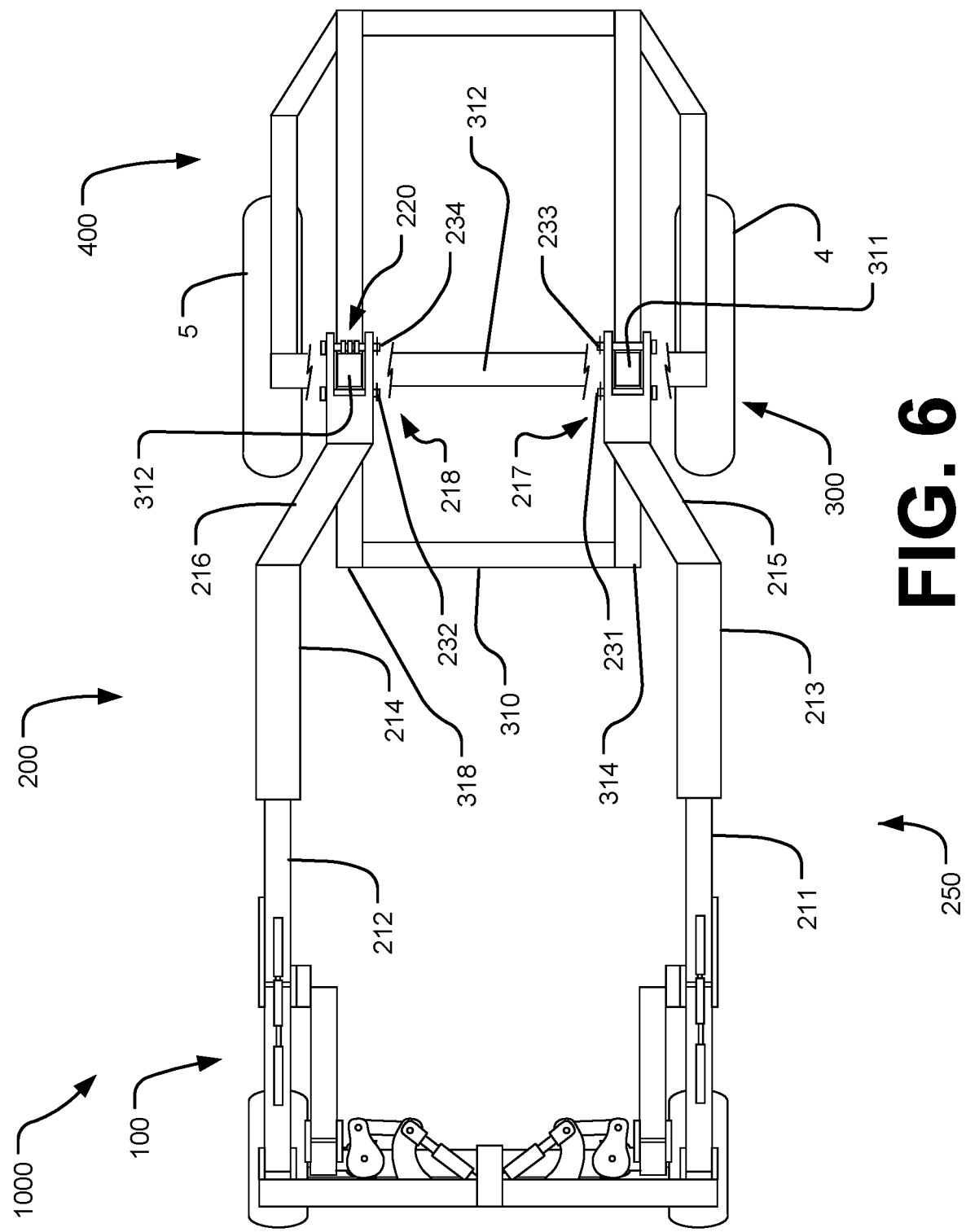
FIG. 6 illustrates a top plan view of an exemplary embodiment of a middle mounted implement tractor, highlighting the frame assemblies.

FIG. 6 illustrates a top plan view of an exemplary embodiment of a middle mounted implement tractor 1000, highlighting the frame assemblies 100, 200, 250, 300, and 400. The connection points between the movable frame assembly 250 and the middle frame 300, as well as the middle frame's components can be seen more clearly in this view.

The mounting frame assembly 200 comprises a pair of forwardly extendable beams 211 and 212 that attach to the front frame assembly 100 at their forward ends. The opposite ends of extendable beams 211 and 212 fit inside of receiving beams 213 and 214. Although not shown, extension hydraulics could be attached between the extendable beams and the receiving beams in order to move the extendable beams in and out of the receiving beams 213 and 214. This extension feature of the current invention is helpful in configuring the tractor to accommodate middle mounted implements of various lengths without having them interfere with the front frame assembly 100. By retracting the extendable beams within the receiving beams, the overall length and wheel base of the tractor can be reduced, allowing for tighter turning radii and smaller parking/storage areas. Also, because the implement attachment points (see FIG. 3, items 221 and 223) are mounted on either side of the extension point, implements can have varying distances between their mounting bars and still be compatible with the instant invention. The adjustment beams 215 and 216 are used to narrow the frame assembly and as attachment points for the vertical sliders 217 and 218. The sliders surround the main vertical beams 311 and 312 of the middle frame 300. When the operator chooses to raise or lower the movable frame assembly 250, the sliders 217 and 218 roll on bearings 220 up and down the main vertical beams 311 and 312. Although only a single set of bearings 220 is shown in FIG. 6, it is contemplated that at least four sets of bearings 220 could be used on each vertical slider 217 and 218: one on each slider pin 232 and 234 located on either side of the vertical beam, and two more on the second set of pins below the top set (see FIG. 17 for possible location of additional pins). Note that this is for the right slider 218, but it would also apply to the left slider 217 (see pins 231 and 233, for example).

Also shown in FIG. 6 are additional middle frame components 310, 312, 314 and 318.

Figure 7A:
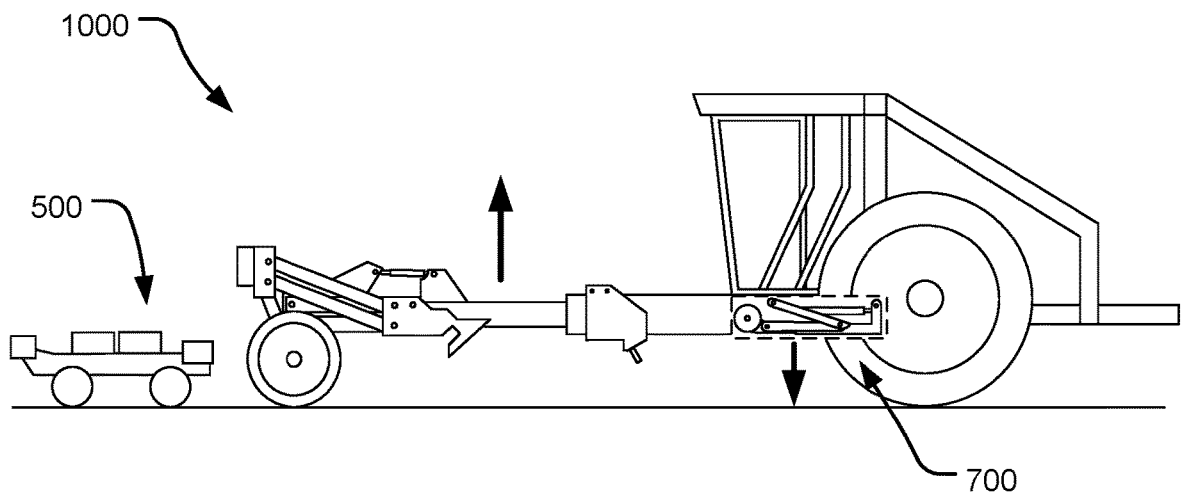
FIG. 7A illustrates a left side elevation view of an exemplary embodiment of a middle mounted implement tractor, showing the tractor preparing to approach a middle mounted implement.

FIG. 7A illustrates a left side elevation view of an exemplary embodiment of a middle mounted implement tractor 1000, showing the tractor preparing to approach a middle mounted implement 500. Note that the dolly wheel assembly 700 is visible in the cut-out box described by the dashed lines. The dolly wheel assembly 700 is shown in its folded position. A large upward pointing arrow shows the direction in which the movable frame 250 will be displaced in order to raise the frame above the middle mounted implement 500. Similarly, a large downward pointing arrow shows the direction in which the dolly wheel assembly will be extended to support the front half of the tractor as the movable frame is raised off the ground.

Figure 7B:
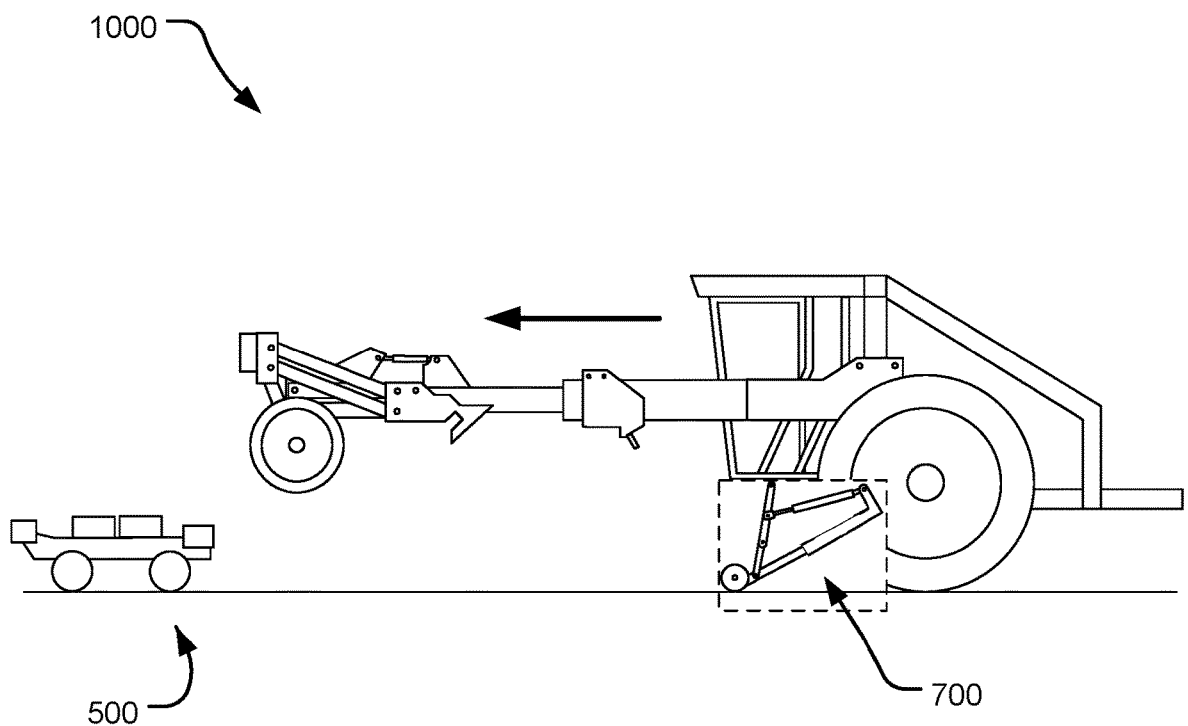
FIG. 7B illustrates a left side elevation view of an exemplary embodiment of a middle mounted implement tractor, showing the tractor having lowered its dolly wheels and with a movable frame in a raised, wheels-up position to attach a middle mounted implement thereto.

FIG. 7B illustrates a left side elevation view of an exemplary embodiment of a middle mounted implement tractor 1000, showing the tractor having lowered its dolly wheels 700 and with a movable frame 250 in a raised, wheels-up position to attach a middle mounted implement 500. The large forwards pointing arrow shows the direction in which the tractor will move in order to put the middle mounted implement in correct position for attachment to the tractor.

Figure 8A:
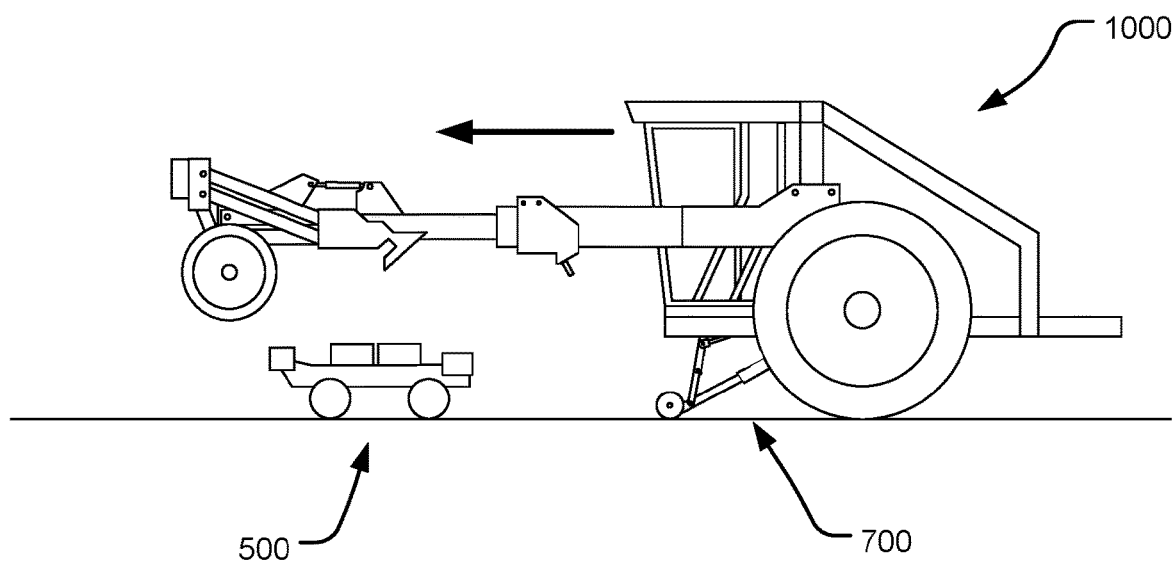
FIG. 8A illustrates a left side elevation view of an exemplary embodiment of a middle mounted implement tractor, showing the tractor having lowered its dolly wheels and with a movable frame in a raised, wheels-up position approaching a middle mounted implement.

FIG. 8A illustrates a left side elevation view of an exemplary embodiment of a middle mounted implement tractor 1000, showing the tractor having lowered its dolly wheels 700 and with a movable frame 250 in a raised, wheels-up position approaching a middle mounted implement 500 in the direction indicated by the large arrow.

Figure 8B:
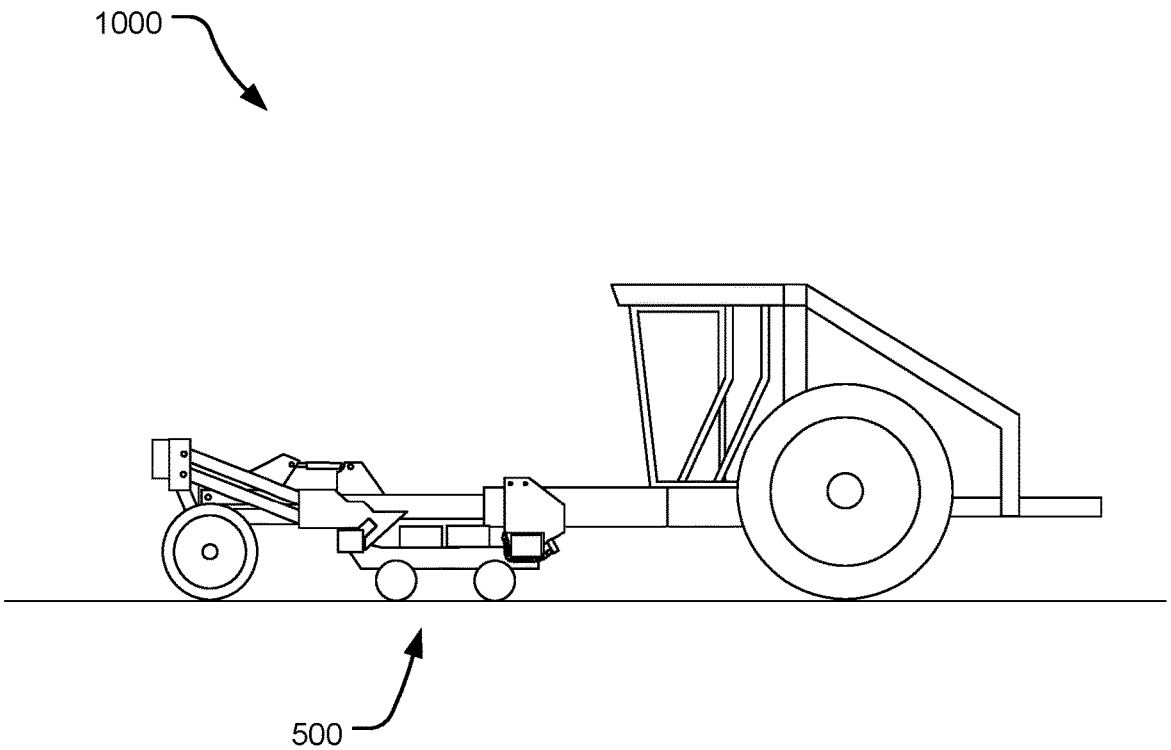
FIG. 8B illustrates a left side elevation view of an exemplary embodiment of a middle mounted implement tractor, showing the tractor having raised its dolly wheels and with a movable frame in a lowered, wheels-down position having attached a middle mounted implement.

FIG. 8B illustrates a left side elevation view of an exemplary embodiment of a middle mounted implement tractor 1000, showing the tractor having raised its dolly wheels (they are now hidden from view) and with a movable frame 250 in a lowered, wheels-down position having attached a middle mounted implement 500 thereto.

Figure 9A:
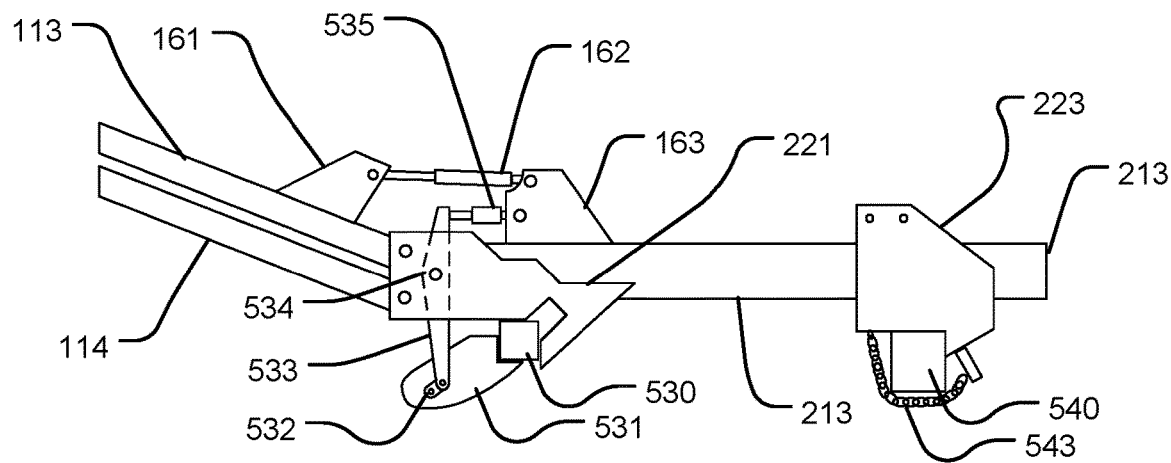
FIG. 9A illustrates a left side elevation view of an exemplary embodiment of a middle mounted implement tractor, highlighting front and rear attachment bars locked into place.

FIG. 9A illustrates a left side elevation view of an exemplary embodiment of a middle mounted implement tractor 1000, highlighting front and rear attachment bars 530 and 540 locked into place. The locking mechanism for the front attachment bar 530 utilizes a front lock 531 shaped so as to engage the front attachment bar 530 and lock it into place against the front attachment point 221. This is accomplished via the forward pushing action of a front lock hydraulic 535, transfer of that motion through a front lock transfer bar 533 via a transfer bar pin 534, causing the bottom of the transfer bar 533 to move rearward. The bottom of the transfer bar 533 is attached to a front lock link 532 which is itself attached to the front lock 531. Thus, when the bottom of the transfer bar is moved rearwards, it pulls the link 532 and the front lock 531 rearwards as well, engaging the front attachment bar 530 between the front lock 531 and the front attachment point 221.

Once the front attachment point 221 is locked in place, the operator of the tractor can retract the extendable beam 211 into the receiving beam 213, thereby engaging the rear attachment bar 530 against the rear attachment point 223. A rear lock 543 can then be placed on the rear attachment bar 540 to ensure it stays in place. In the embodiment shown in FIG. 9A a chain is shown, in other embodiments, other locking means are contemplated.

Although FIG. 9A only shows the left side of the tractor, a similar apparatus can be utilized on the right side. It is also important to understand that, in one embodiment, the attachment bars 530 and 540 are built onto or pre-attached to each implement that is to be used with the tractor 1000. In another embodiment, the attachment bars 530 and 540 are not permanently affixed to the implements but can instead be interchanged. In any case, since the bars 530 and 540 serve as the means of connection between implements and the tractor, they must be built to withstand extreme forces and punishment. In yet other embodiments, other means of connecting the implements to the tractor are contemplated.

Figure 9B:
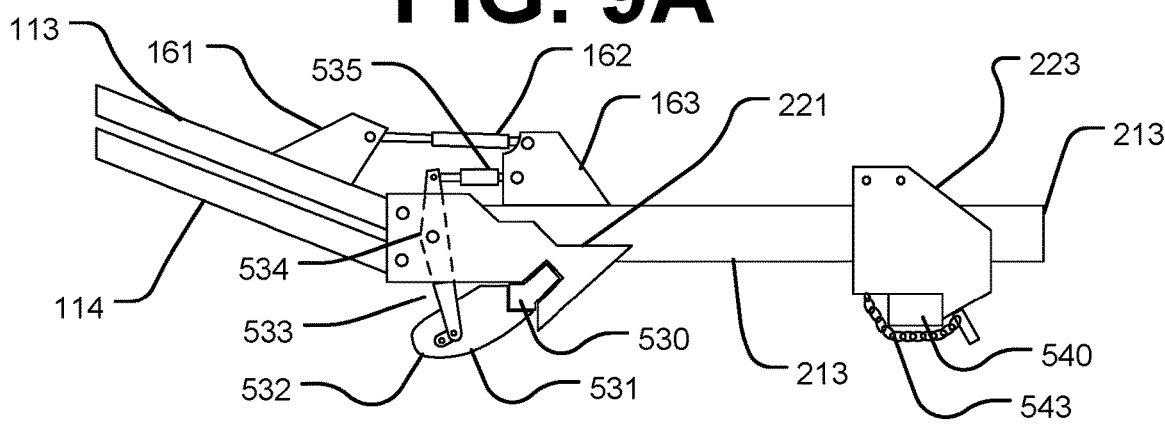
FIG. 9B illustrates a left side elevation view of an exemplary embodiment of a middle mounted implement tractor, highlighting alternative front and rear attachment bars locked into place.

FIG. 9B illustrates a left side elevation view of an exemplary embodiment of a middle mounted implement tractor 1000, highlighting alternatively shaped and sized front and rear attachment bars 530 and 540 locked into place. Notice that the shapes and sizes of the attachment bars 530 and 540 can vary and yet remain compatible with the attachment components shown in FIG. 9A.

Figure 9C:
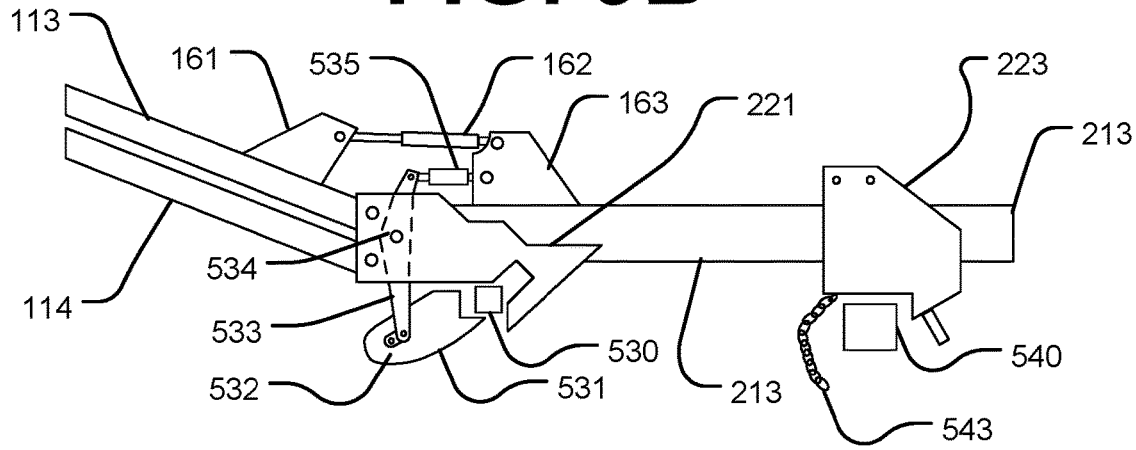
FIG. 9C illustrates a left side elevation view of an exemplary embodiment of a middle mounted implement tractor, highlighting disconnected front and rear attachment bars.

FIG. 9C illustrates a left side elevation view of an exemplary embodiment of a middle mounted implement tractor 1000, highlighting disconnected front and rear attachment bars 530 and 540. In this view, it is apparent that the front lock 531 has been unlocked and swung forward to disconnect the front attachment bar 530 from the front attachment point 221. The front lock link 532 allows the front lock 531 to swivel such that the entire front lock 531 can be swung downwards, far away from the front attachment bar 530 to allow plenty of working-room when positioning the tractor relative to the middle mounted implement in order to mount the implement thereon.

Figure 10:
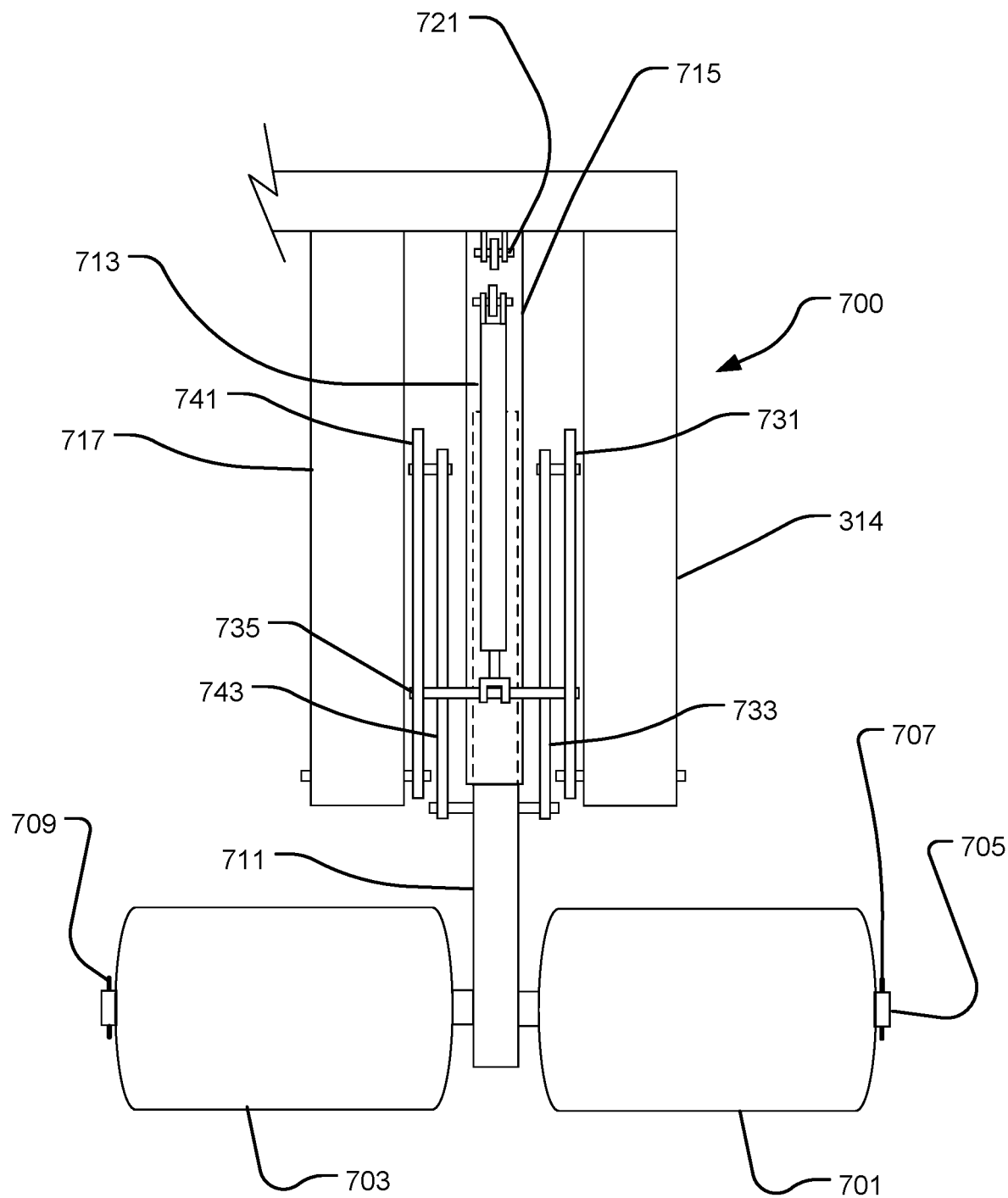
FIG. 10 illustrates a top plan view of an exemplary embodiment of a middle mounted implement tractor, highlighting the left side dolly wheels assembly in a raised position.

FIG. 10 illustrates a top plan view of an exemplary embodiment of a middle mounted implement tractor 1000, highlighting the left side dolly wheels assembly 700 in a raised position. The right side dolly wheels could be a mirror image or a duplicate.

The dolly wheels assembly 700 utilizes dolly wheels 701 and 702 on an axle 705. Retainer pins 707 and 709 retain the wheels on the axle (other wheel retention mechanisms are contemplated). The lower strut 711 connects the axle to the rest of the assembly. As can be seen by the dashed-line continuation of the lower strut 711, a significant portion of the lower strut 711 is retained inside the upper strut 715 when the dolly wheels assembly 700 is in a raised position.

As the dolly hydraulic cylinder 713 extends, the force is transferred to extend the lower strut 711 by swinging down the upper extension members 731 and 741 which are attached to the dolly cylinder 713 via the cylinder cross member 735. The lower extension members 733 and 743 are attached to the upper extension members 731 and 741 which are attached at their other ends to the dolly side beams 314 and 717, respectively. The beams 314 and 717 are a part of the middle frame assembly 300. All of the aforesaid connections are pivotally attached via pins, or some similar method that allows the attachment points to pivot. Thus, as the hydraulic cylinder 713 extends, the upper extension members 731 and 741 and lower extension members 733 and 743 are forced to scissor open. This scissoring action causes the extension members to extend downwards, causing the lower strut 711 to be drawn out of the upper strut 715, thereby extending the dolly wheels 701 and 703 downwards and forwards. It is important to note that the upper strut 715 is attached to the frame of the tractor with a pivot pin 721 as well.

Figure 11:
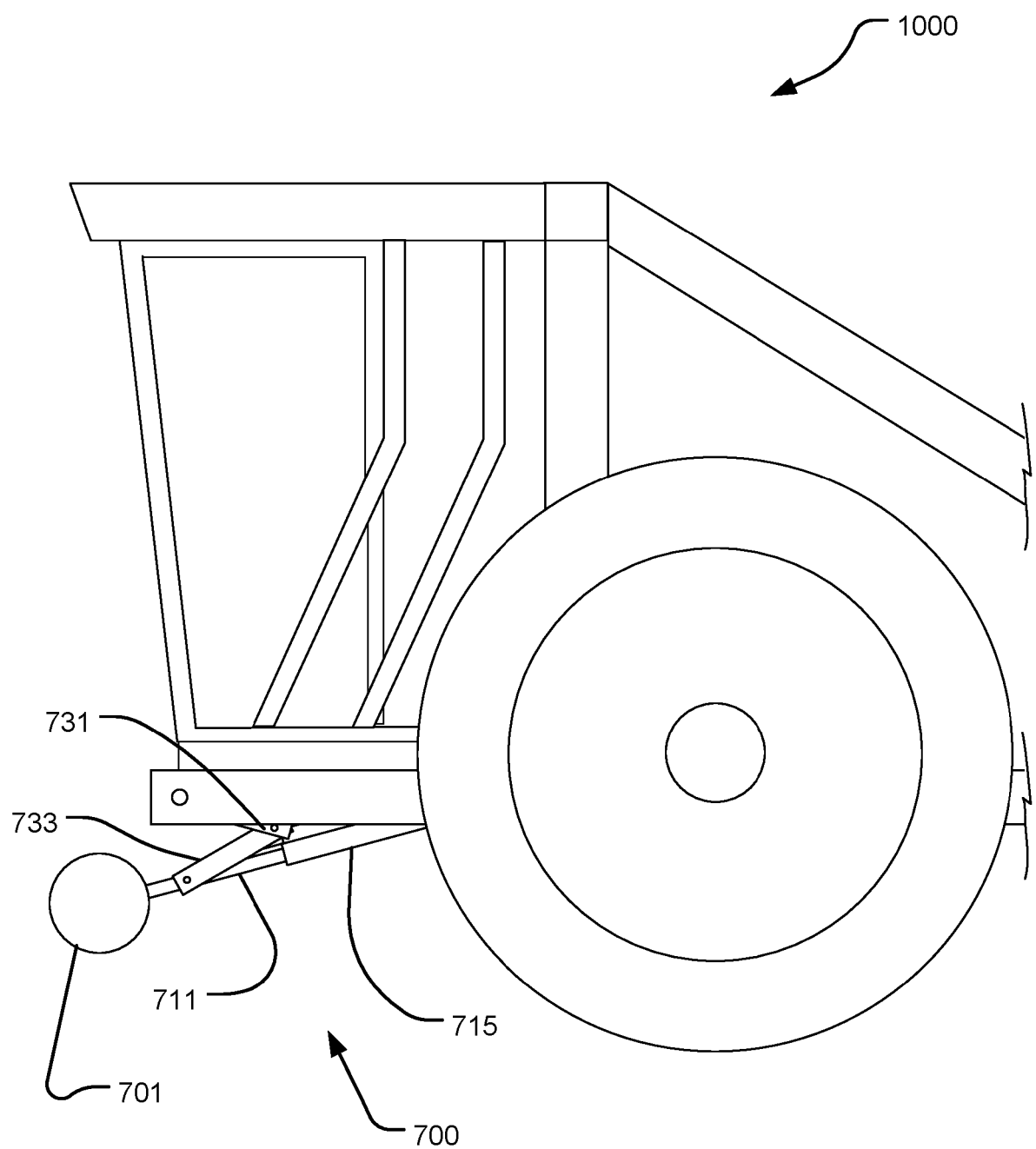
FIG. 11 illustrates a left side elevation view of an exemplary embodiment of a middle mounted implement tractor, highlighting the left side dolly wheels in a partially lowered position.

FIG. 11 illustrates a left side elevation view of an exemplary embodiment of a middle mounted implement tractor 1000, highlighting the left side dolly wheels in a partially lowered position. Some of the components of the dolly wheels described above are illustrated in this view. Specifically, the scissoring action of the upper extension member 731 relative to the lower extension member 733 is apparent as they extend partially downwards.

Figure 12:
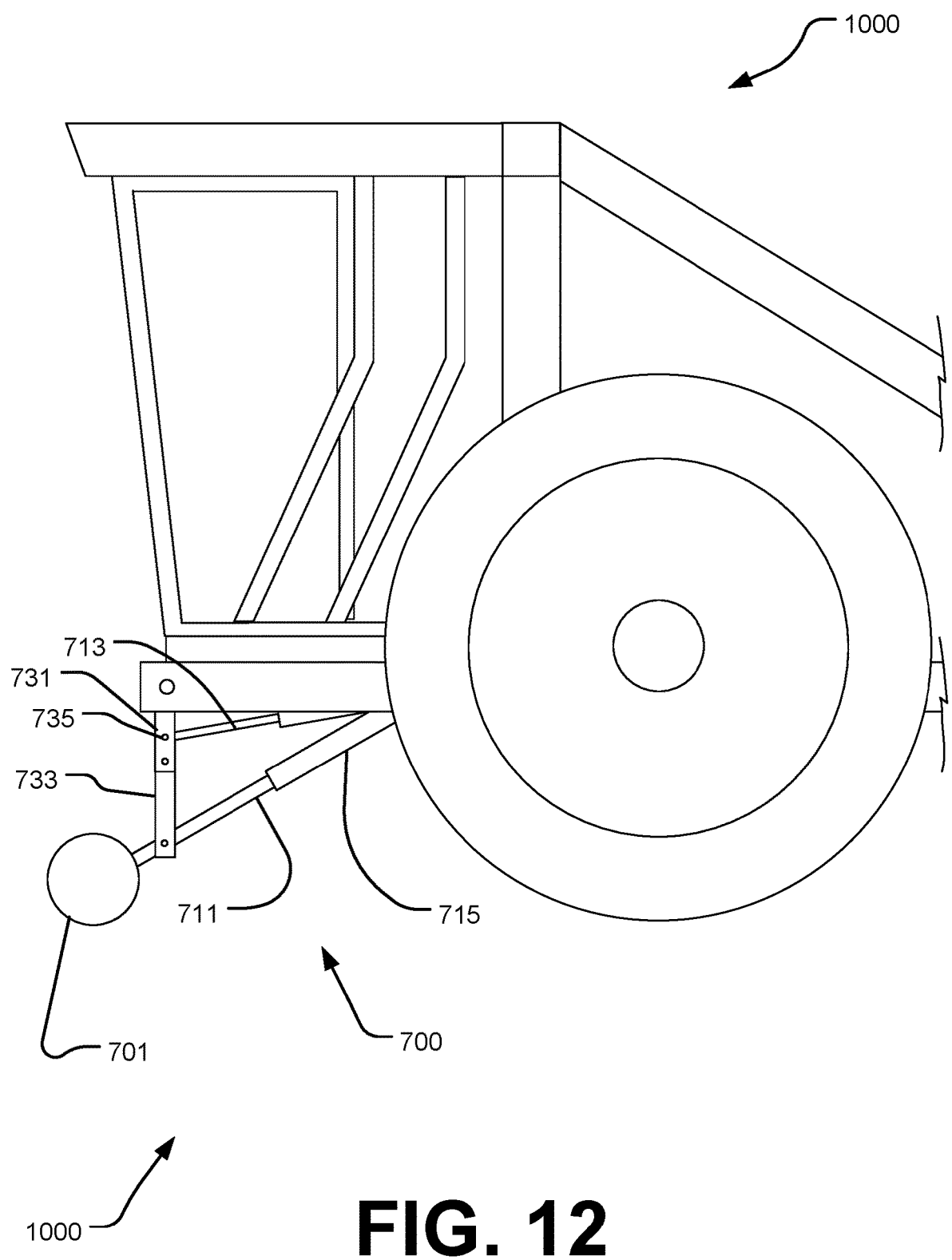
FIG. 12 illustrates a left side elevation view of an exemplary embodiment of a middle mounted implement tractor, highlighting the left side dolly wheels in a lowered position.

FIG. 12 illustrates a left side elevation view of an exemplary embodiment of a middle mounted implement tractor 1000, highlighting the left side dolly wheels in a lowered position. Some of the components of the dolly wheels described above are illustrated in this view. Specifically, the scissoring action of the upper extension member 731 relative to the lower extension member 733 is apparent when comparing this view to FIG. 12 as the extension members 731 and 733 are fully extended downwards here.

The dolly wheel assemblies 700 are provided to allow the operator to detach an implement and attach another one without having to slide the implement under the movable main frame assemble from the side or zigzagging the tractor over the implement from the side. The dolly wheels consist of left and right side pairs that may be raised and lowered using hydraulic cylinders. They are located underneath the front area of the cab floor and are connected to the frame. Similar to retractable landing gear on aircraft, these wheels are normally in the raised position; tucked up underneath the cab. They are lowered using a scissor and sliding action so that they touch the ground just in front of the cab as seen in FIG. 12 and will support the weight of the entire front portion of the tractor.

For normal operations, the dolly wheels remain in the upper position. The lowering operation begins with the extension of the hydraulic cylinder which is pivotally connected at its rearward end to the rear main frame. As the forward end of the cylinder extends, it causes a scissor action extension with parallel arms which are pivotally connected. Note that the forward ends of the extension members 731 and 741 are pivotally connected to the middle frame assembly 300. The forward ends of the extension members 733 and 743 are pivotally connected to a lower strut 711. This action begins to lower both struts which telescope towards the front and downwards, allowing the double pairs of dolly wheels to contact the ground below and slightly ahead of the cab. Retracting the cylinder reverses this motion raising the dolly wheels.

Figure 13:
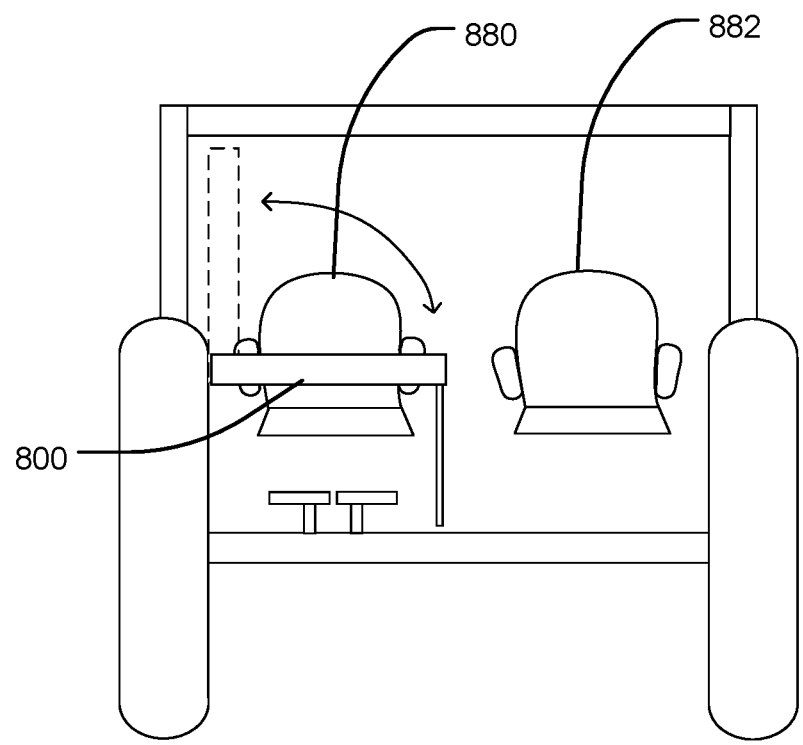
FIG. 13 illustrates a front elevation view of an exemplary embodiment of a middle mounted implement tractor, highlighting the cab interior configuration showing the fold-down nature of the main dash.

FIG. 13 illustrates a front elevation view of an exemplary embodiment of a middle mounted implement tractor 1000, highlighting the cab interior configuration showing the fold-down nature of the main dash 800. The broken line shows the main dash 800 in its stored position while the double-ended arrow depicts the directions of movement for the unfolding/folding motions. The result of unfolding is the main dash 800 shown in its fully deployed position in FIG. 13. Also shown are the operator and passenger seats 880 and 882. In other embodiments, more conventional, non-folding dash components may be utilized.

Figure 14:
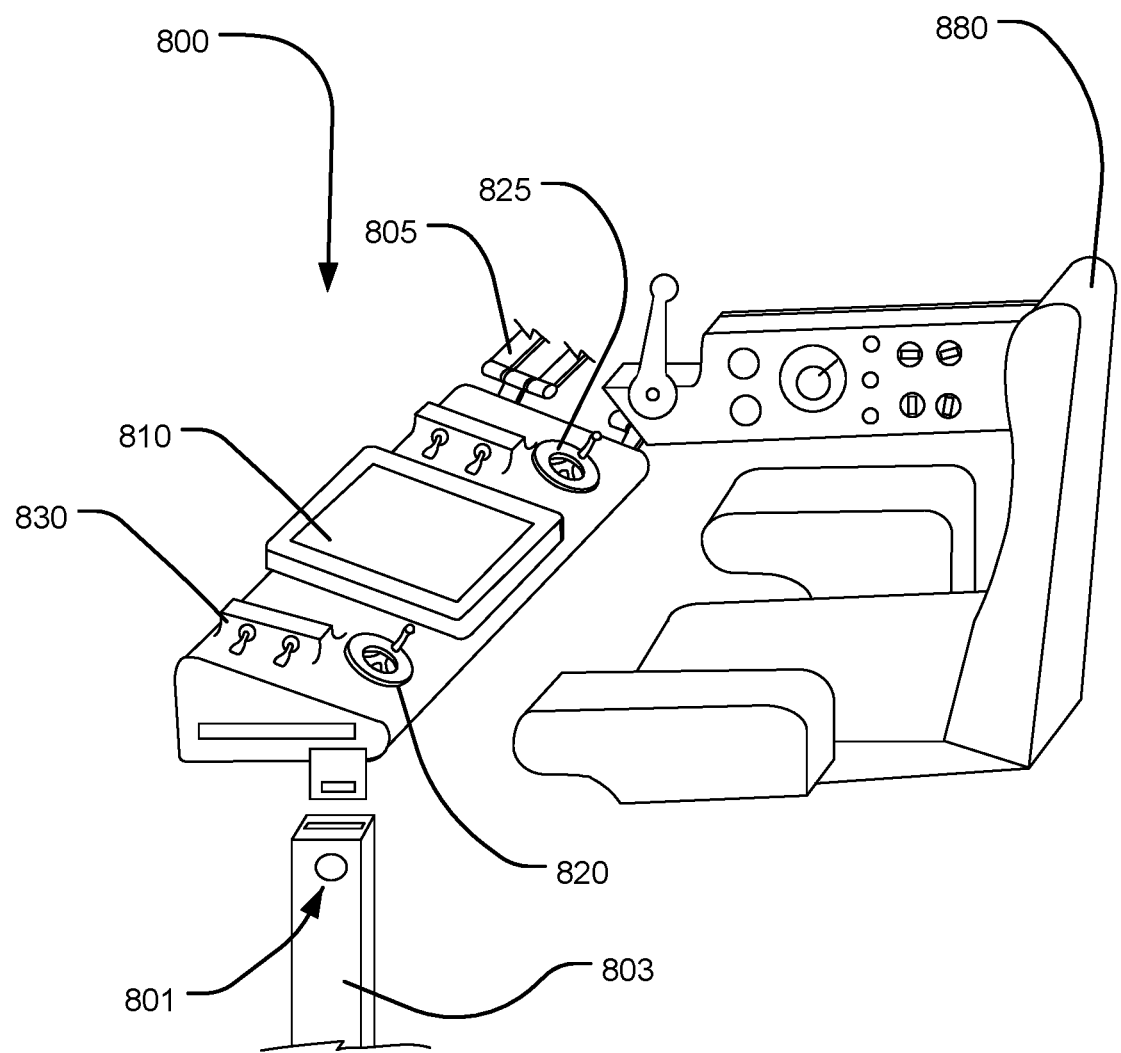
FIG. 14 illustrates a left side perspective view of an exemplary embodiment of a middle mounted implement tractor, highlighting the main dash in a deployed configuration.

FIG. 14 illustrates a left side perspective view of an exemplary embodiment of a middle mounted implement tractor 1000, highlighting the main dash 800 in a deployed configuration. There are a number of representative switches, gauges, controls, etc., that are shown as potential environmental variables. The main dash 800 could itself employ any number of configurations of controls, dials, gauges, etc. In one embodiment, the main dash 800 may contain an electronic touch screen computer 810 and a first and second steering wheel 820 and 825 (preferably slaved to one another so that if either is turned the other turns as well) for turning the front wheels. The electronic touch screen computer 810 can include readouts of all important tractor systems, characteristics, use statistics, etc. It can be actuated by touch to change readouts and perform functions throughout the tractor, implements, consumables carriage, etc. Possible display items include, but are not limited to: miles per hour, fuel level, fuel use per hour, engine temperature, hydraulic fluid temperature, ambient temperature, GPS coordinates, auto-drive control and alignment systems, implement controls (such as setting the depth the implement works the soil), spraying metrics (such as coverage, rate of use, remaining amounts), video images from one or more cameras mounted on the tractor and/or implements, etc. A dash hinge 805 is visible as is the dash support 803 and dash lock 801.

A unique main dash 800 can be positioned forward of the operator's seat 880 and might be described as a lap console. This console can pivot at a point 805 on its right side to facilitate raising it to allow the operator to be seated or to leave the seat. When the operator is seated, the lap console can be pivotally lowered to a position which can span across the operator's lap, just above his legs to allow for comfortable movement. When this console is lowered it will click into a horizontal position with a dash lock 801 that can be similar to a seat belt type connector. This connection can also be part of a larger automatic seat belt restraining mechanism located underneath the lap console and continuing down both sides of the seat. Such a system would employ a seat belt that will remain loose above the operator (underneath the console) until it will be actuated (and thus tightened) in the event of a crash or rollover.

The lap console contains two small steering wheels 820 and 825 in place of a conventional single large steering wheel normally positioned directly in front of the operator. In one embodiment, the two small steering wheels—one for the left hand and one for the right hand—can be placed in front of the arm rests on each side of the operator's seat 880. These steering wheels can be linked together so the operator may steer with either hand (or both) at any time. An electronic touch screen computer 810 can be placed between the steering wheels directly in front of the operator. This touch screen can be used for controlling many of the tractor's functions as well as all currently available "apps" or applications, such as GPS guidance, sprayer setup and information systems, browsing the Internet, communications, video images from one or more cameras mounted on the tractor and/or implements, and telemetry. Also contained in the lap console can be a plurality of switches 830 for controlling the tractor functions such as lifting and lowering the moveable frame and dolly wheels and controlling functions of a sprayer, planter, etc. Sensors/positioners can be attached throughout the tractor 1000 and automated responses can be programmed in based on readings/conditions/alerts or the system can provide data back to the operator so he can respond manually. The system can also employ GPS to assist the operator in guiding the tractor during field operations.

Figure 15A:
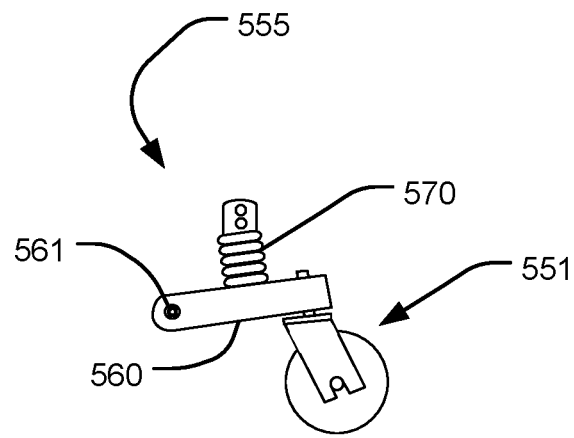
FIG. 15A illustrates a left side elevation view of an exemplary embodiment of a middle mounted implement tractor, highlighting the left rear caster wheel.

FIG. 15A illustrates a left side elevation view of an exemplary embodiment of a middle mounted implement tractor, highlighting the left rear caster wheel assembly 555. Load bearing caster wheels 551 are positioned in the rear of the tractor on both sides and follow the same wheel tracks as the rear tires. The caster wheels 551 are located to the rear of an elongated arm 560 which pivots up and down at a point 561 on a shaft 562 connected to the rear main frame. The weight of the rear of the tractor, and in particular, the weight of the consumables carriage carried thereon, is transmitted to the caster wheels through an adjustable air bag 570 placed near the center of the elongated arm. Air bags are chosen over a coil spring so that the operator may adjust the amount of weight that is placed on the caster wheels with the remainder of the weight being placed on the rear wheels. This adjustment can be accomplished by switches, valves, and gauges from the cab.

Figure 15B:
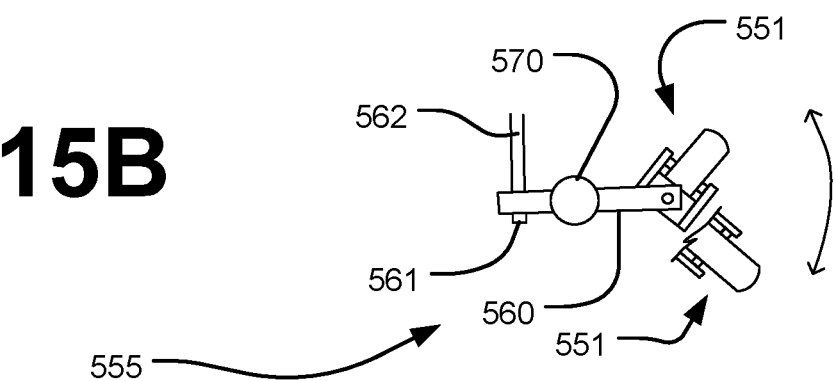
FIG. 15B illustrates a top plan view of an exemplary embodiment of a middle mounted implement tractor, highlighting the left rear caster wheel.

FIG. 15B illustrates a top plan view of an exemplary embodiment of a middle mounted implement tractor, highlighting the left rear caster wheel assembly 555. The same components as in 15A are shown, except for the addition of the shaft 562. The shaft 562 can be an axle-like rod that extends out from the frame. This leads out to a pivot point 561 that has a lynch pin or large cotter pin. The wheel 551 itself can be a simple wheel and tire, as known in the industry. In another embodiment, standard aircraft tires, for example, fifteen or sixteen ply, can be used. The caster wheel pin that goes up through the elongated arm 560 can have a keeper pin. The wheel can spin through 360 degrees+ like a typical caster.

Figure 15C:
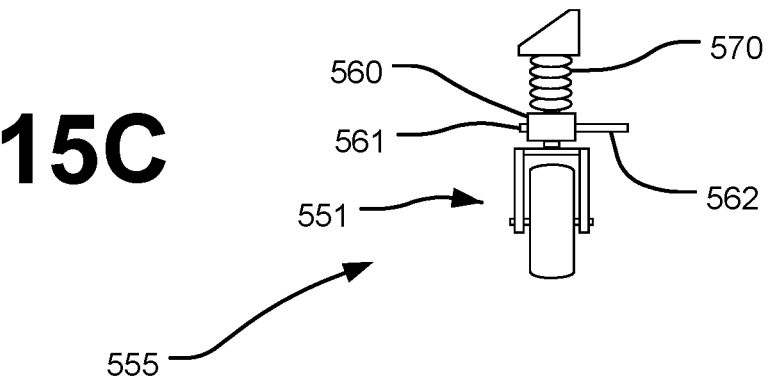
FIG. 15C illustrates a rear elevation view of an exemplary embodiment of a middle mounted implement tractor, highlighting the left rear caster wheel.

FIG. 15C illustrates a rear elevation view of an exemplary embodiment of a middle mounted implement tractor, highlighting the left rear caster wheel assembly 555. In one embodiment, the air bags 570 are able to displace the rear frame assembly up to fifteen inches vertically in height, or more.

Figure 16A:
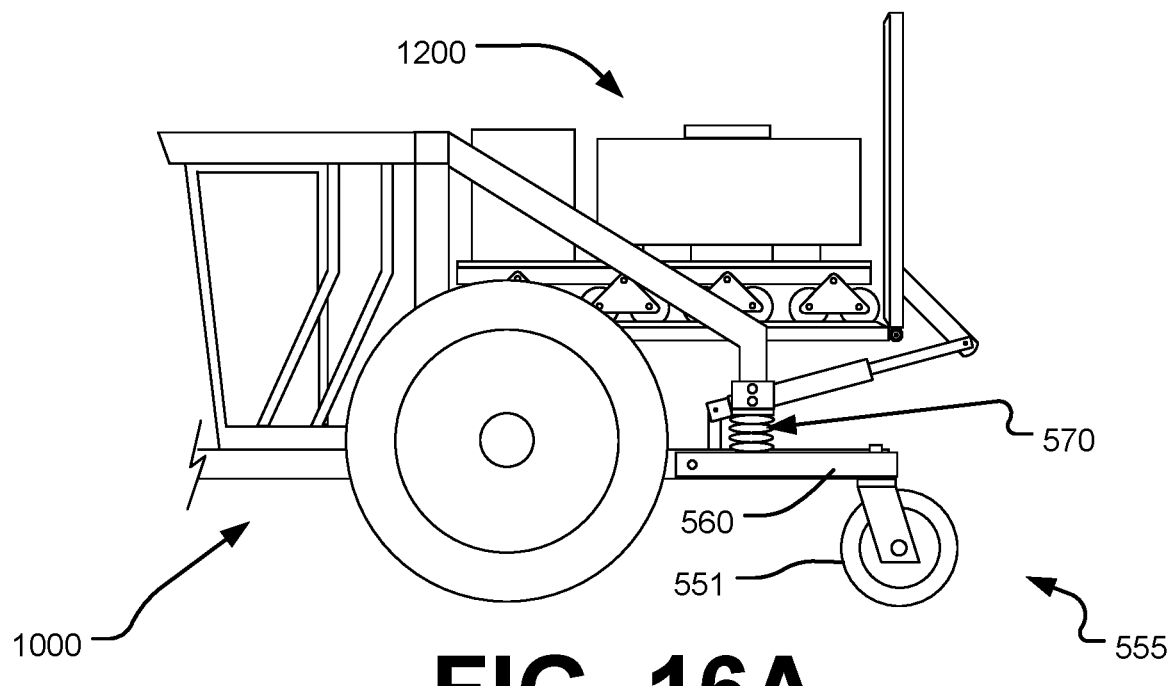
FIG. 16A illustrates a left side elevation view of an exemplary embodiment of a middle mounted implement tractor and a consumables carriage, highlighting a consumables carriage assembly and the left rear caster wheel.

FIG. 16A illustrates a left side elevation view of an exemplary embodiment of a middle mounted implement tractor and a consumables carriage 1000, highlighting a consumables carriage 1200 and the left rear caster wheel assembly 555. The consumables carriage 1200 is shown in FIG. 16A as already loaded onto the tractor 1000. Given that one, two, or more carriages can be loaded on the rear frame assembly 400 of the tractor 1000, and, depending on the carriages' contents, they can weigh hundreds to thousands of pounds each, the utility of the castor wheel assemblies 555 becomes more apparent.

Figure 16B:
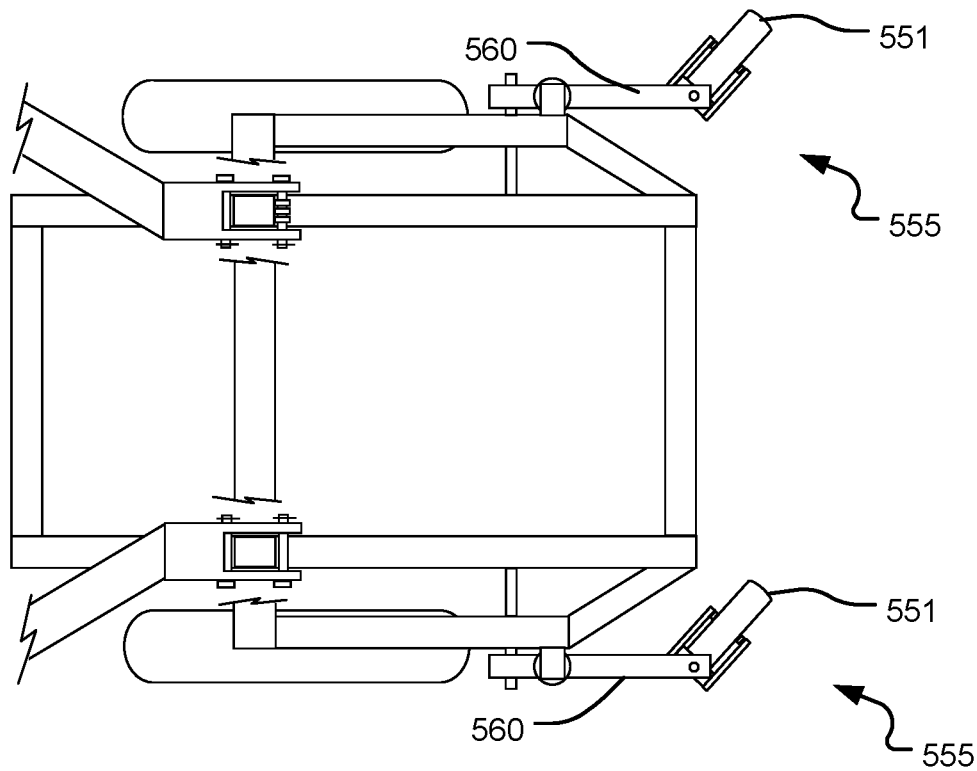
FIG. 16B illustrates a top plan view of an exemplary embodiment of a middle mounted implement tractor, highlighting the rear caster wheels.

FIG. 16B illustrates a top plan view of an exemplary embodiment of a middle mounted implement tractor 1000, highlighting the rear caster wheels 555. Note that the height of each caster wheel 551 relative to the rear frame 400 can be adjustable independently. Furthermore, either or both of the assemblies can be easily removable.

Figure 17:
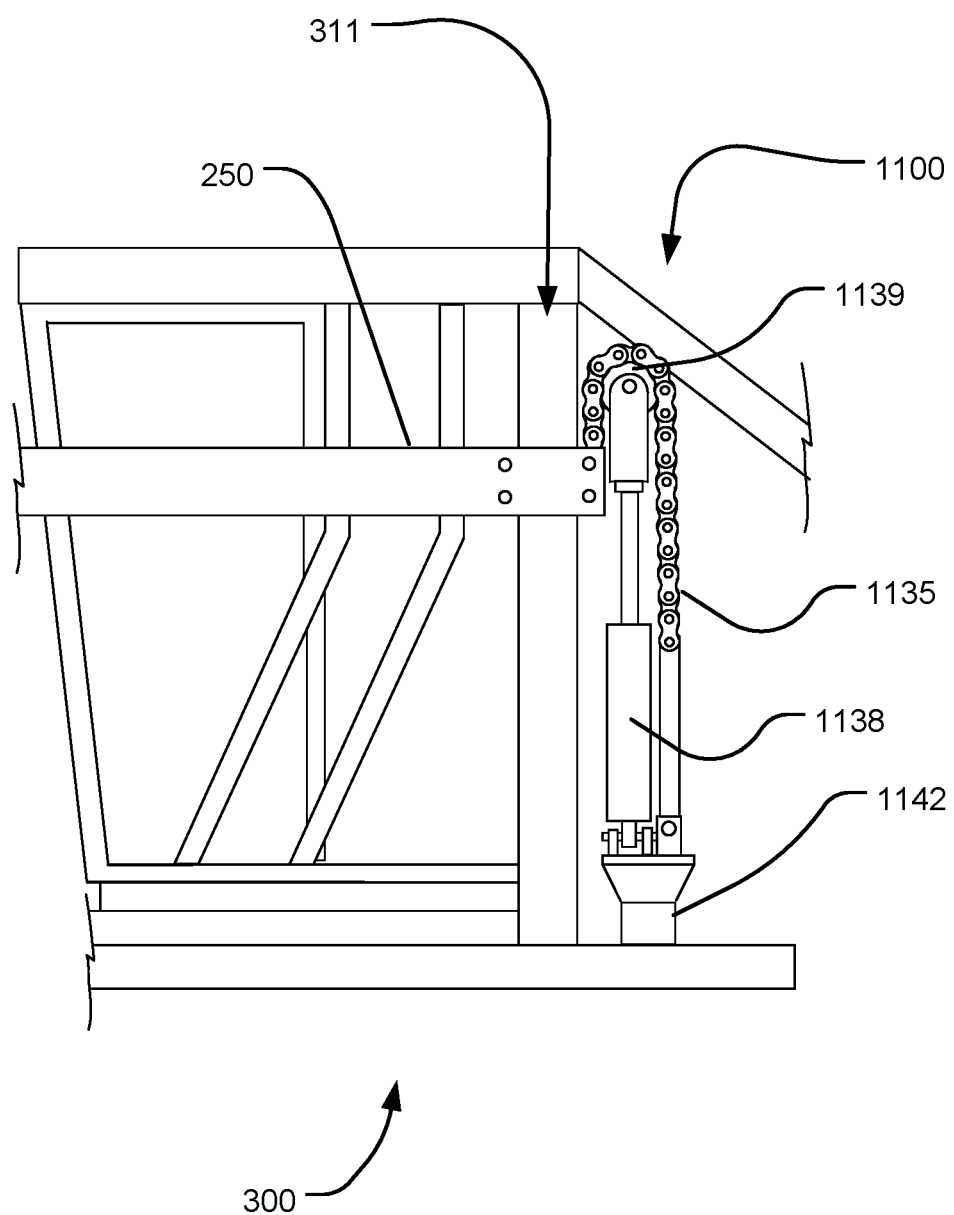
FIG. 17 illustrates a left side elevation view of an exemplary embodiment of a middle mounted implement tractor, highlighting a frame mover mechanism with the movable frame in a raised position.

FIG. 17 illustrates a left side elevation view of an exemplary embodiment of a middle mounted implement tractor 1000, highlighting a frame mover mechanism 1100 with the movable frame 250 in a raised position. The moveable frame 250 is movable up or down with respect to the rear frame assembly 400 and the ground below. In the up or raised position, the movable main frame 250 is designed to "carry" an implement above the ground for transporting or turning at the end of the field. When lowered, the movable frame 250 allows the implement to assume its "in the ground" working position.

In order to effect movement of the moveable frame 250 via the frame mover mechanism 1100, a number of subcomponents can be employed as follows. The movable frame 250 can be connected, via one or more chains 1135 or other stout but flexible means, to a pivoting mount 1142 on the middle frame assembly 300 near the rear of vertical beams 311 and 312 (note, only one apparatus is shown in FIG. 17, however, a second similar apparatus (or more than two) can be emplaced on the middle frame 300 as desired). Located to the outside and rearward of the vertical beam 311 is a mounted hydraulic cylinder 1138. Atop this cylinder is a roller chain idler sprocket 1139. A roller chain 1135 passes over this sprocket and its rearward end is connected to the middle frame assembly 300 while its forward end is connected to the rear of the moveable frame assembly 250. When the one or more cylinders 1138 extend, the moveable frame 250 will rise. Similarly, when they retract, the movable frame 250 will be lowered. Although the frame mover mechanism 1100 is illustrated in FIG. 17 as being positioned in close proximity to the vertical beams 311 and 312, it can be placed further back on the middle frame 300 (requiring, of course, that the rear end of the moveable frame assembly also be extended past the vertical beams 311 and 312) in order to take advantage of principles of leverage, as needed.

Additionally, the movable frame 250 can be repositionable via direct hydraulic action or any other suitable means. Because of the potentially large weight of the movable frame 250 and attached assemblages and implements, a system of counterweights may also be attached further back from the vertical beams 311 and 312 on the movable frame 250. In such a case, the cylinder assembly can be repositioned inboard or outboard to avoid any needed rearward extension of the movable frame 250. In the embodiment illustrated in FIG. 17, the movable frame 250 is connected to the middle frame 300. In alternate embodiments, because the middle frame 300 can be fixedly connected to the rear frame 400, the frame mover mechanism 1100 can be connected to the rear frame 400 instead of or in addition to the middle frame 300.

The embodiment of the frame mover mechanism 1100 illustrated in FIG. 17 is adapted to allow the movable frame 250 (and any middle mounted implement attached thereto) to float as the tractor moves. Thus, if a middle mounted implement where to impact concrete, bedrock, or another similarly non-giving impediment, the entire movable frame 250 would rise up and allow the implement to traverse over the impediment without causing the entire tractor to be violently flung upwards.

Figure 18:
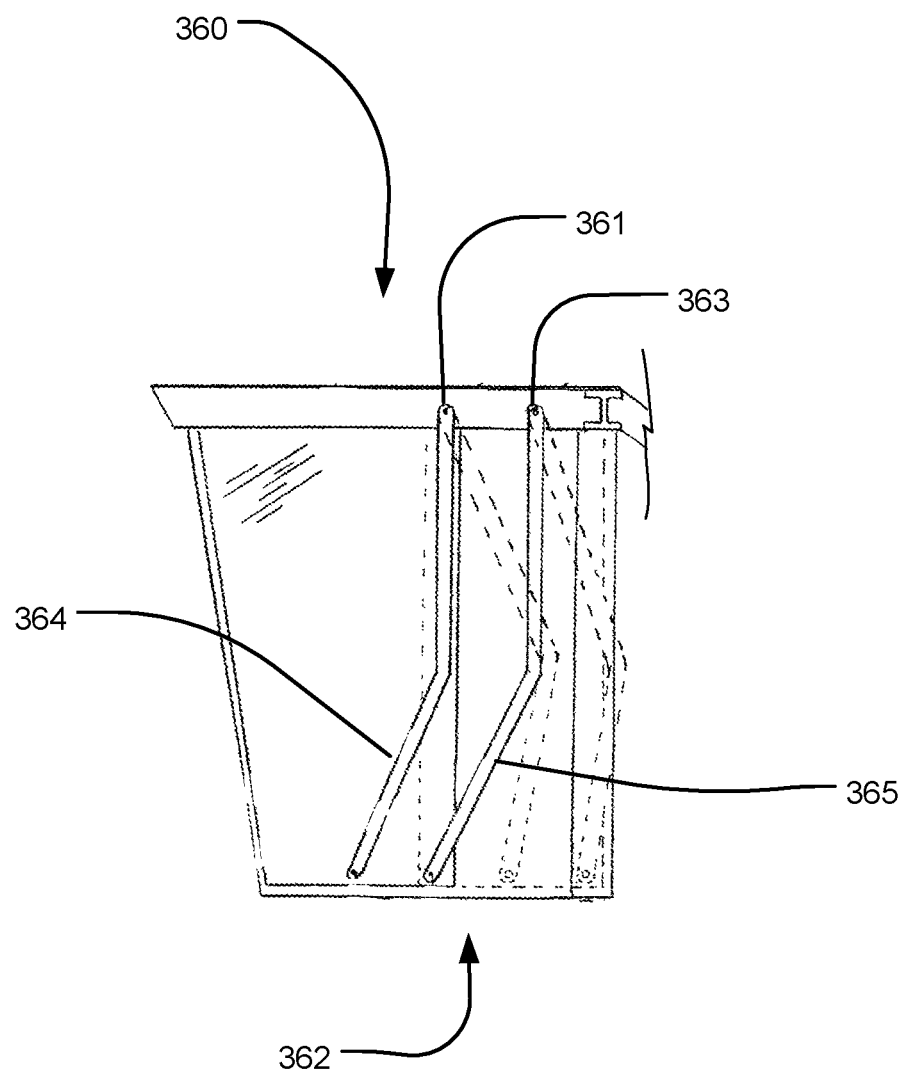
FIG. 18 illustrates a left side elevation view of an exemplary embodiment of a middle mounted implement tractor, highlighting a swinging motion of a left cab door.

FIG. 18 illustrates a left side elevation view of an exemplary embodiment of a middle mounted implement tractor 1000, highlighting a swinging motion of a left cab door 362 on the cab 360.

The cab door 362 is shown in FIG. 18 in the closed position. To open the door, a handle or other actuator (not shown) is used to free the door from the surrounding cab, and then the door 362 swings or slides front to rear without needing to employ a track. Instead, long swing arms 364 and 365 are used. They pivot at points near their top ends 361 and 363 and their bottom ends, and being attached to the door 362, they carry the door backwards as they swing back. The broken lines in FIG. 18 illustrate the position of the swing arms 364 and 365 when the door 362 is in the open position.

Figure 19:
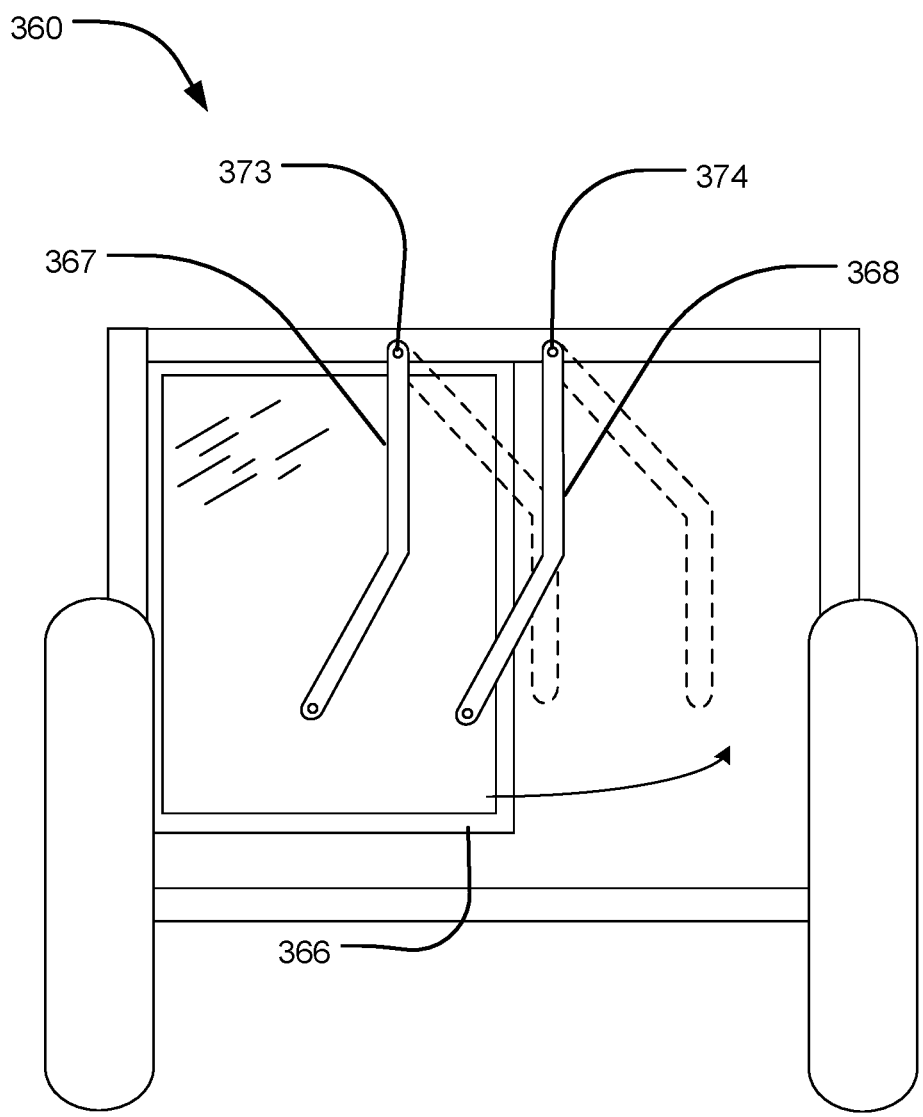
FIG. 19 illustrates a rear elevation view of an exemplary embodiment of a middle mounted implement tractor, highlighting a swinging motion of a rear cab door.

FIG. 19 illustrates a rear elevation view of an exemplary embodiment of a middle mounted implement tractor 1000, highlighting a swinging motion of a rear cab door 366. The rear cab door 366 can open by swinging to the right to provide access in and out of the rear of the cab. This door can be located to the rear of the second seat 882 which can pivot forward at its floor mount, thereby providing a pathway to the rear door 366. This rear door not only provides an egress but also access to the consumables carriages (particularly any sprayer tanks, associated valves, etc.). In a similar fashion as the main cab door 362 in FIG. 18, the rear door 366 can be hung using two parallel bars 367 and 368 which pivot at points 373 and 374. When the door opens, it swings slightly downwards and then goes back into the same level position, but offset a considerable distance to the right.

Figure 20:
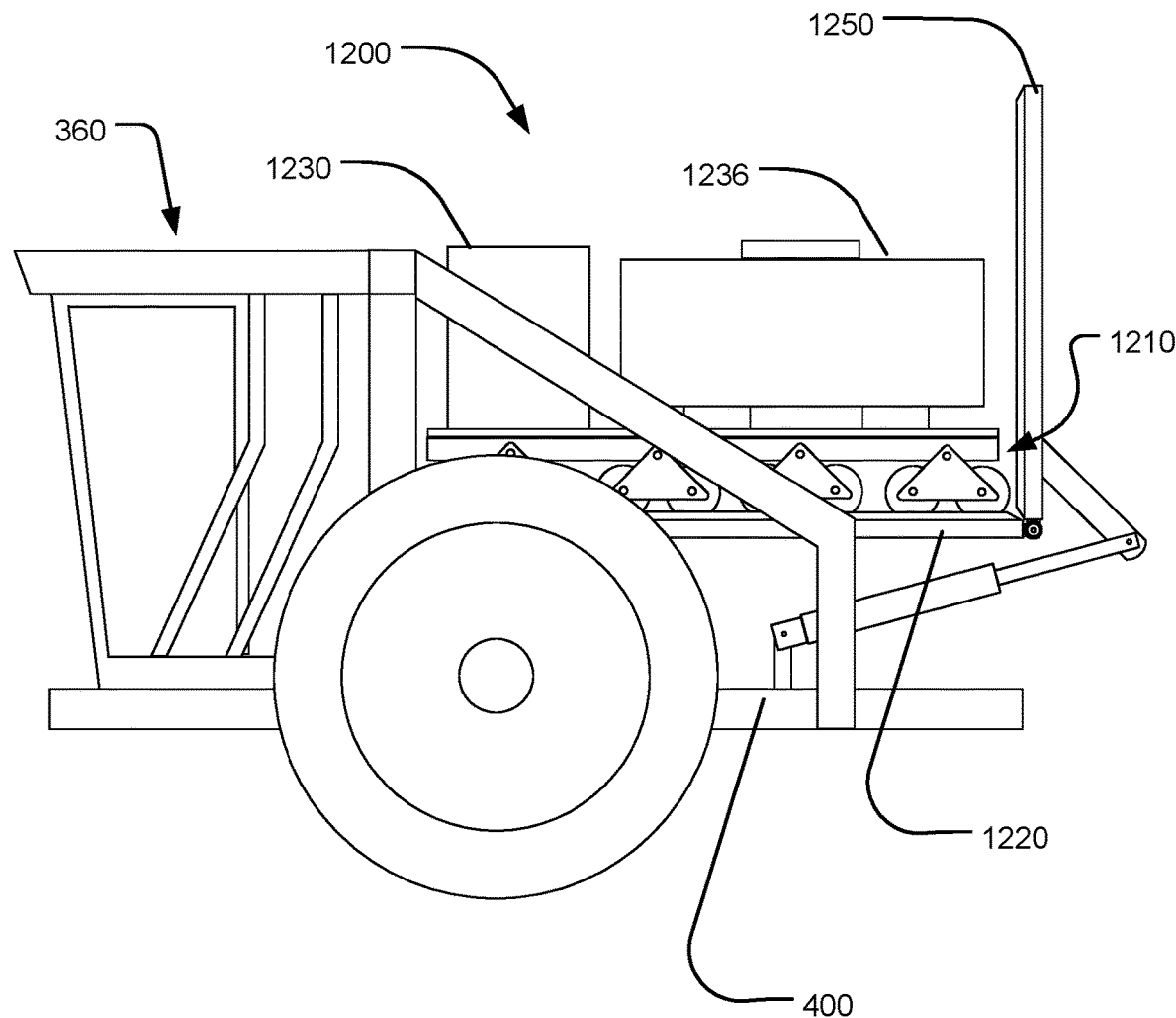
FIG. 20 illustrates a left side elevation view of an exemplary embodiment of a middle mounted implement tractor and a consumables carriage, highlighting a loaded consumables carriage with a closed loading ramp.

FIG. 20 illustrates a left side elevation view of an exemplary embodiment of a middle mounted implement tractor and a consumables carriage 1000, highlighting a loaded consumables carriage assembly 1200 with a closed loading ramp 1250. The consumables carriage 1210 rides on track rails 1220 mounted on the rear frame 400. When the loading ramp 1250 is in its upright, closed position, the carriage 1210 is secured onto the tractor 1000. In the embodiment shown in FIG. 20, only one consumables carriage is shown; in other embodiments, two, three, or more carriages are contemplated. The carriages can carry tanks, sprays, seeds, or any other agricultural product (or similar items) as needed.

For example, the consumables carriage assembly 1200 can include a choice of different containers. In FIG. 20, a dry container 1230 for seed or dry fertilizer is shown. Additionally, liquid tanks such as tank 1236, may contain water, liquid fertilizer, or sprayer solutions. Another option would be pressurized tanks for materials such as anhydrous ammonia. As contemplated in the embodiment of FIG. 20, two consumables carriages 1210 are placed side-by-side behind the cab 360. The side-by-side configuration allows for more flexibility as the carriages can be loaded separately onto the track rails 1220.

The carriage system allows an operator to transfer the whole system at once from a flatbed trailer or truck onto the tractor. The consumables carriage 1210 comprises a flat, pallet-like top on rollers and can be constructed to be interchangeable and easily swapped in and out. An air system or other means for moving seeds, sprays, and other consumables can be placed underneath the carriage assembly 1200 to move the seeds and other consumables to the middle mounted implement (or other locations). For example, the implement can be a sprayer boom and liquids are transferred from the consumables carriage tank 1236 to the sprayer boom.

Figure 21:
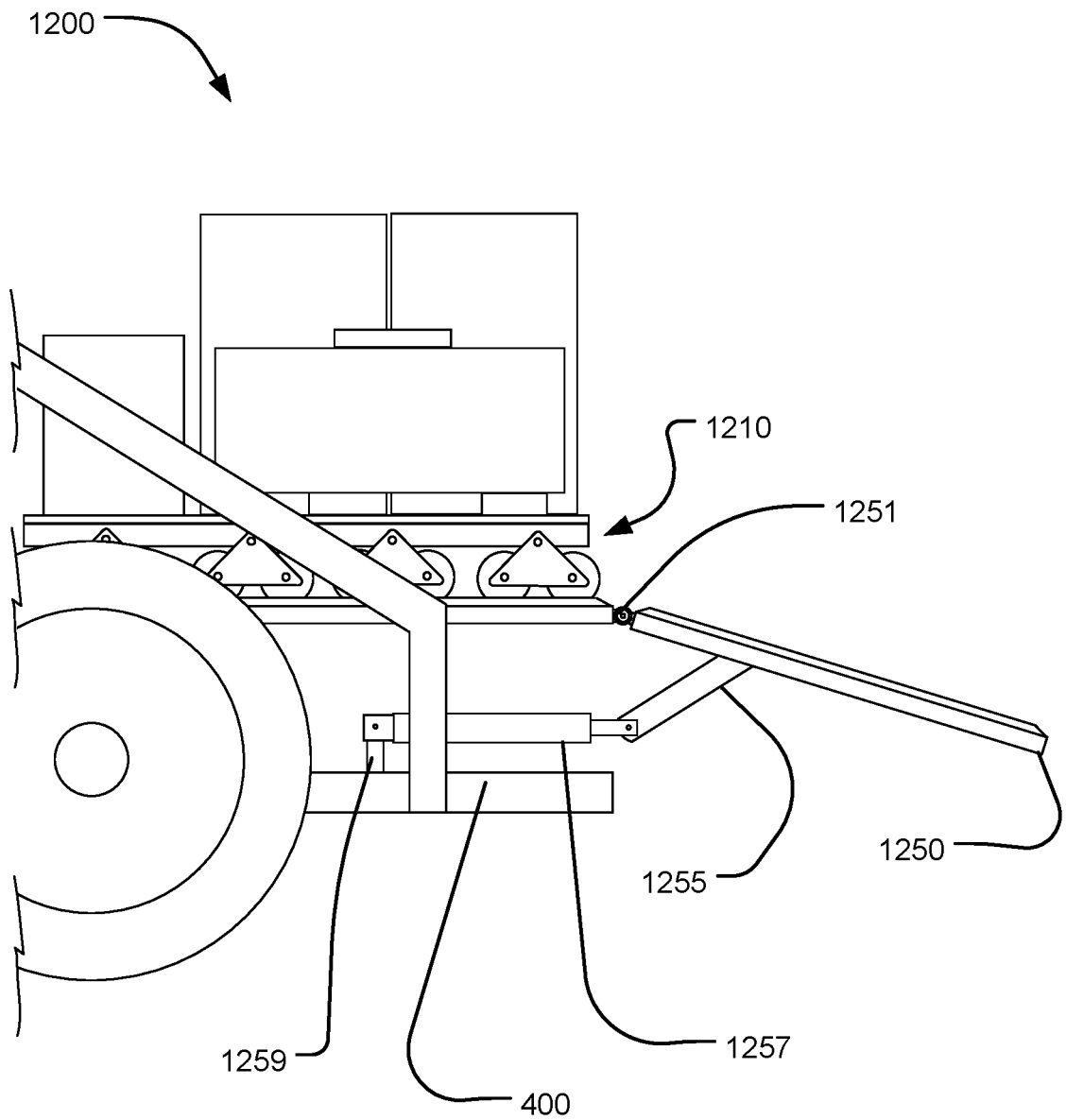
FIG. 21 illustrates a left side elevation view of an exemplary embodiment of a middle mounted implement tractor and a consumables carriage, highlighting a loaded consumables carriage with an open loading ramp.

FIG. 21 illustrates a left side elevation view of an exemplary embodiment of a middle mounted implement tractor and a consumables carriage 1000, highlighting a loaded consumables carriage assembly 1200 with an open loading ramp 1250. The ramp has a hinge 1251 that allows it to be swung downward by retraction of the ramp hydraulics 1257 that are attached to the ramp 1250 by a ramp arm 1255. The ramp hydraulics 1257 can be attached to the rear frame 400 by a ramp clevis and pin 1259 or by other means. It is contemplated that manual and/or automated locking mechanisms can be used to lock the ramp in various positions as well as to lock/unlock the carriages 1210 to/from the tractor 1000.

Figure 22:
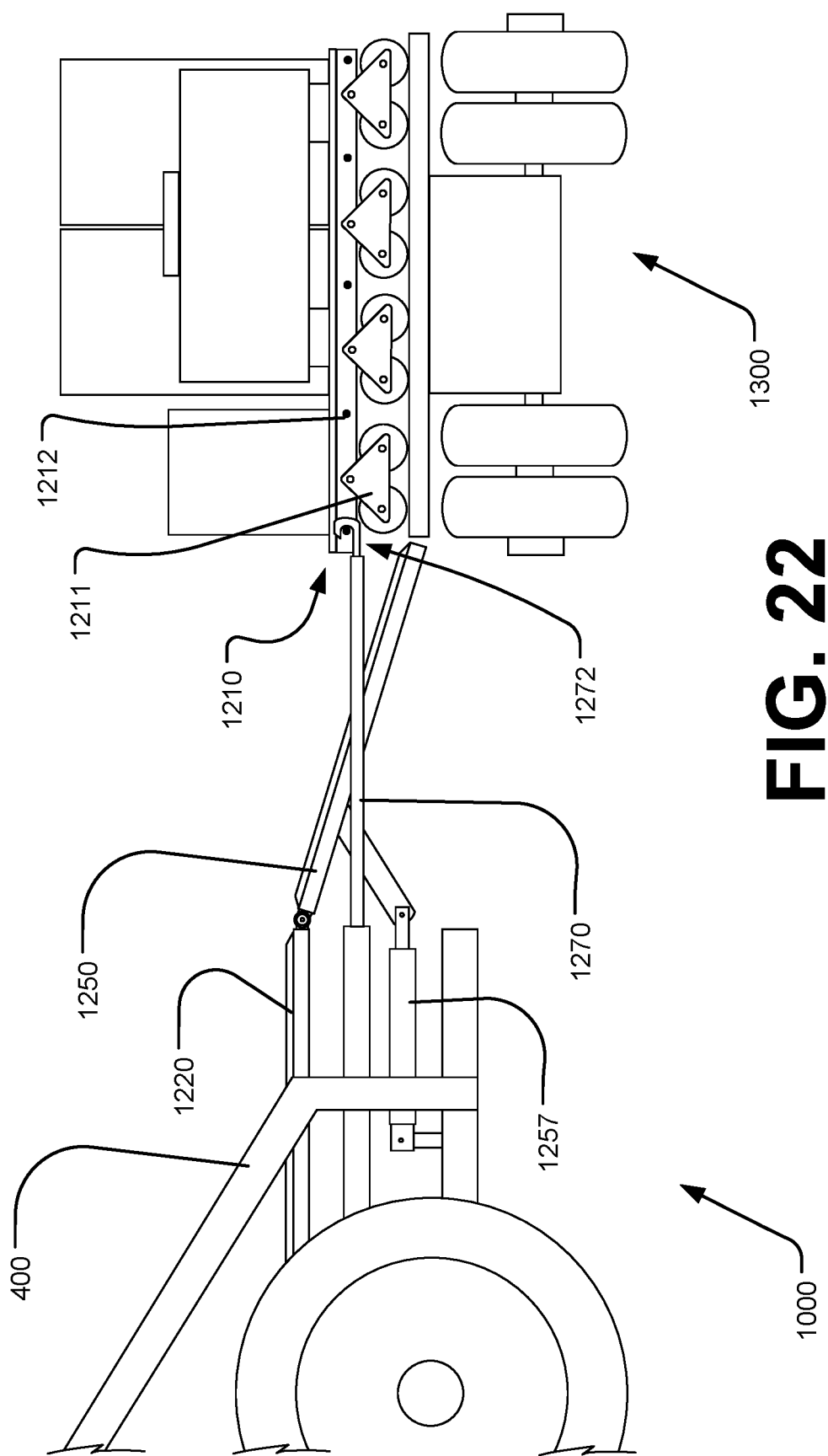
FIG. 22 illustrates a left side elevation view of an exemplary embodiment of a middle mounted implement tractor and a consumables carriage, highlighting an open loading ramp and a truck carrying a consumables carriage ready to be loaded.

FIG. 22 illustrates a left side elevation view of an exemplary embodiment of a middle mounted implement tractor and a consumables carriage 1000, highlighting an open loading ramp 1250 and a truck 1300 carrying a consumables carriage 1210 ready to be loaded.

The consumables can be transferred to and from a flatbed truck or trailer to the tractor using a plurality of roller-equipped transfer carriages 1210. Since the transfer system is automated, an operator may quickly exchange empty tanks for full ones, or change to a different type of tank without leaving the field.

In a working operation, the truck or flatbed trailer, etc., with carriages secured to the bed would travel to a location such as a seed dealer or fertilizer distributor and they would place the prefilled material tanks (such as the seed, fertilizer, etc.) on top of the carriages with a forklift (which is necessary for all customers buying pallets of items). After the material tanks are secured to the carriages, the driver proceeds to the field and approaches the rear of the tractor 1000. The tractor operator then reverses the tractor to the side of the trailer as in FIG. 22 and lowers the loading ramps 1250 with the ramp hydraulics 1257 (only one cylinder is shown in FIG. 22, but each ramp can be equipped with a cylinder, or two or more ramps could be actuated using a single cylinder). Aligning the lowered ramps with the rollers on the carriage 1210, the operator allows the rearward end of the ramps to rest on the flatbed just touching the first roller 1211 and then uses the loading system to move the carriages 1210 onto the tractor 1000. Although not shown in FIG. 22, it is contemplated that the entire carriage assembly 1200 on the back of the tractor 1000 may be constructed such that it can slide left and right in order to easily line up the heavy carriages on the truck 1300 with the loading ramps 1250. Alternatively, the track rails 1220 and loading ramps 1250 can be the only components that shift side-to-side.

Figure 23:
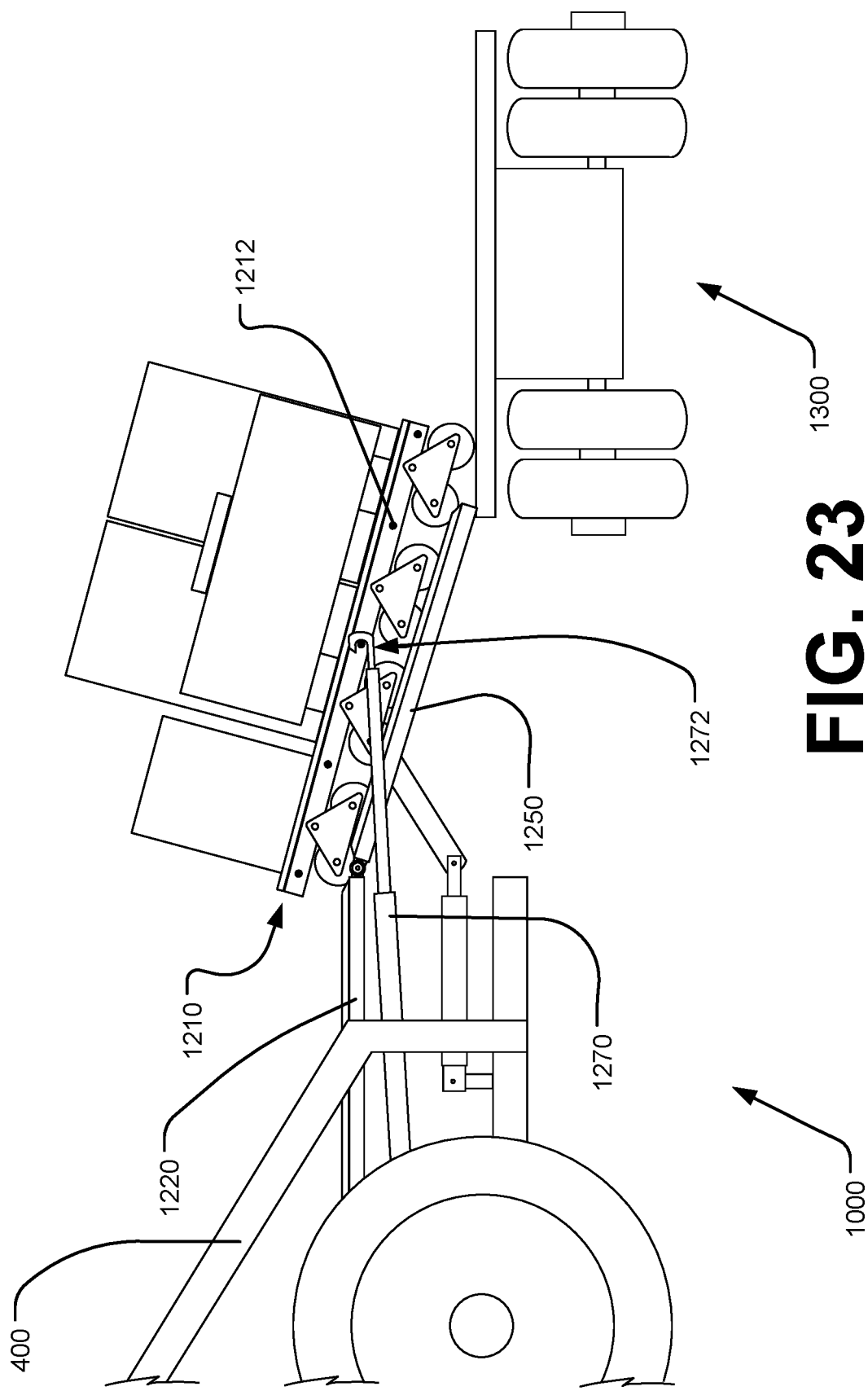
FIG. 23 illustrates a left side elevation view of an exemplary embodiment of a middle mounted implement tractor and a consumables carriage, highlighting a consumables carriage being loaded.

Built into the tractor is a means to hydraulically move the carriages 1210 from the flatbed trailer or truck 1300 onto the rear frame 400 of the tractor and then back to the truck 1300 when necessary. The loading means comprises a hydraulic loading cylinder 1270 and a load hook 1272. Built into the carriages 1210 are a serious of hook pins 1212. In order to load a carriage 1210 from a truck 1300 to the tractor 1000, the load cylinder 1270 is extended and the load hook 1272 is placed around a hook pin 1212. The cylinder is then retracted, thereby pulling the carriage and its load up onto the loading ramp 1250. As shown in FIG. 23, multiple iterations of retracting the cylinder and moving the load hook to progressively more distant hook pins 1212 may be necessary to load the carriage completely onto the tractor 1000. In another embodiment, winches may be utilized to pull the carriages onto the tractor.

In order to ensure that the carriages 1210 do not roll backwards, automatic brakes can be built into the wheel systems they use such that any unwanted down or back motion is restricted while loading. It is contemplated that multiple carriages 1210 can be loaded onto the tractor 1000. Additional hydraulic loading cylinders 1270, ramps 1250, etc. may be utilized.

FIG. 23 illustrates a left side elevation view of an exemplary embodiment of a middle mounted implement tractor and a consumables carriage 1000, highlighting a consumables carriage 1210 being loaded. As noted in the FIG. 22 description above, multiple iterations of moving the loading cylinder 1270 and load hook 1272 to more distant load pins 1212 may be necessary to move the carriage 1210 all the way onto or off of the tractor 1000. In FIG. 23, the carriage 1210 has been moved almost completely off the truck and onto the load ramp 1250. Further retraction of the load cylinder 1270 should move the carriage almost halfway onto the track rails 1220 and then only a single additional iteration should be required to finish the load process. As can be seen by the angle at which the tanks, etc. are placed while the carriage is being loaded, the materials on the carriages should be strapped down prior to attempting to load them onto the tractor 1000.

Once the carriages are in place on the tractor, the operator makes the necessary connections to allow the consumable products to move to the implement. In the case of a dry product such as seed or fertilizer, the operator opens the door on the bottom of the material tank, letting the product flow into a funnel type receiver built into the tractor. From there, perhaps using an air transfer method, the material can be moved forward through piping to the implement in the center of the tractor. Liquid material can be transferred using currently available pumping and piping to a sprayer boom or implement such as a liquid fertilizer applicator.

It should be noted that when the carriages are in place on the rear of the tractor, they are positioned above the mechanical parts of the tractor which include the engine, transmission, hydraulic pumps, etc. None of these components are illustrated in the drawing Figures for clarity in illustrating the other components.

Figure 24:
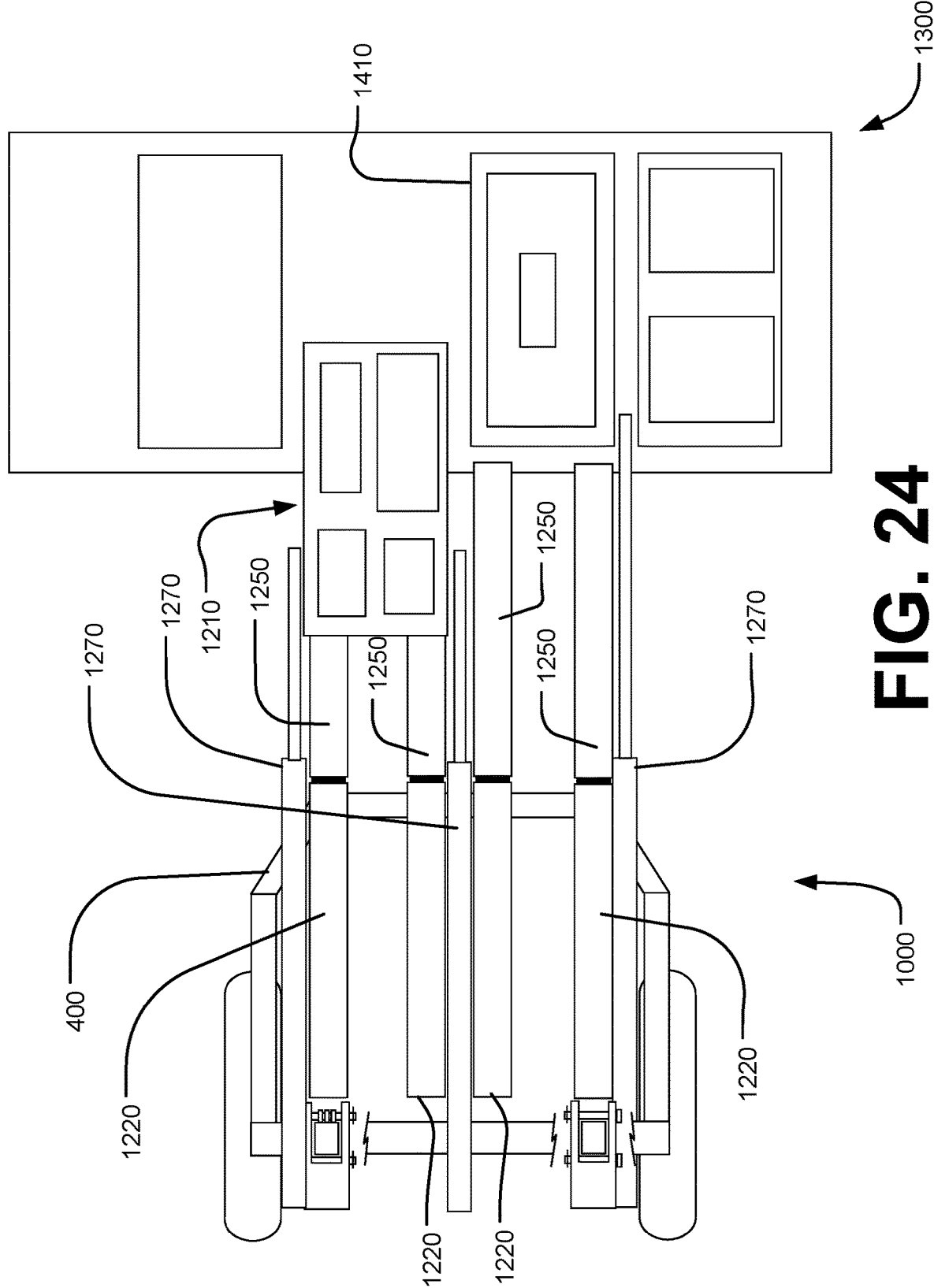
FIG. 24 illustrates a top plan view of an exemplary embodiment of a middle mounted implement tractor and a consumables carriage, highlighting a first consumables carriage being loaded and a second consumables carriage awaiting loading.

FIG. 24 illustrates a top plan view of an exemplary embodiment of a middle mounted implement tractor and a consumables carriage 1000, highlighting a first consumables carriage 1210 being loaded and a second consumables carriage 1410 awaiting loading. As can be seen in this top plan view, each carriage 1210/1410 can utilize two loading ramps 1250. In a standard configuration, there is room for four loading ramps and two carriages on the rear frame 400 of the tractor 1000. In other configurations, a single carriage or three or more can be loaded.

The first carriage 1210 that is being loaded in FIG. 24 is utilizing a pair of loading cylinders 1270. In other embodiments, a single loading cylinder may be used. Also shown in FIG. 24 is a third loading cylinder 1270 attached to the waiting carriage 1410. Once the middle loading cylinder 1270 has finished loading the first carriage 1210, it can be retasked to assist in the loading of the waiting carriage 1410.

FIG. 25 illustrates a perspective view from the rear showing the front right knee assembly. As can be seen in close-up in FIG. 25, the rotating shaft 186 fits within the wheel knee 106. The pivotal axle frame 107 is attached to the wheel knee 106 as is the vertical extension 119. The rotating shaft 186 can turn within the wheel knee 106. Since the spindle 104 is attached to the rotating shaft 186, it should be clear that by turning the shaft 186, the operator also rotates the spindle 104. And as the spindle 104 is attached to the front wheel 3, the wheel 3 is consequently turned as well (see FIGS. 4 and 5 for more information).

Figure 26:
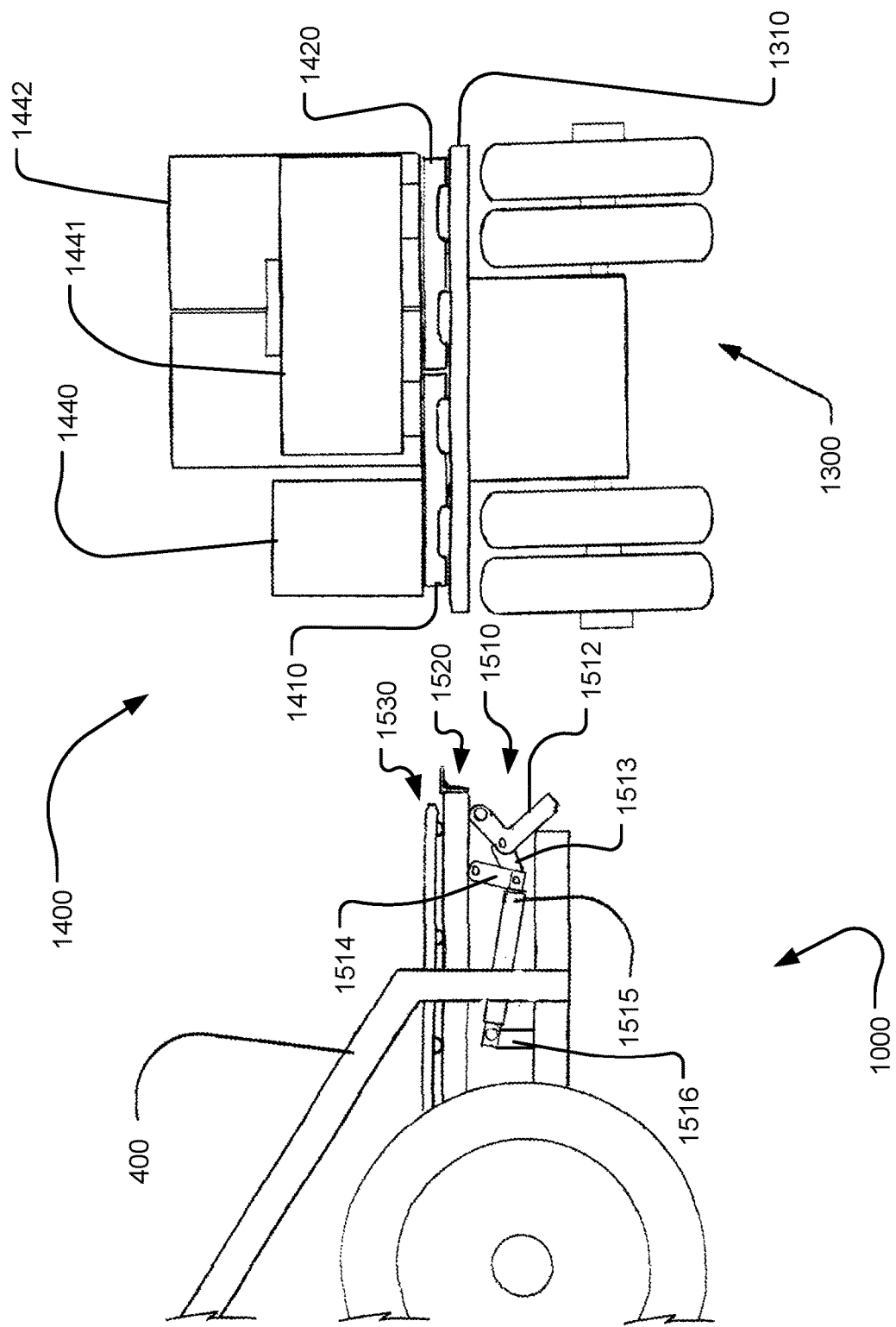
FIG. 26 illustrates a side elevation view of an embodiment that utilizes a type of integrated pallet fork mechanism instead of a consumables carriage approaching a flatbed truck containing pallets of consumables.
Figure 27:
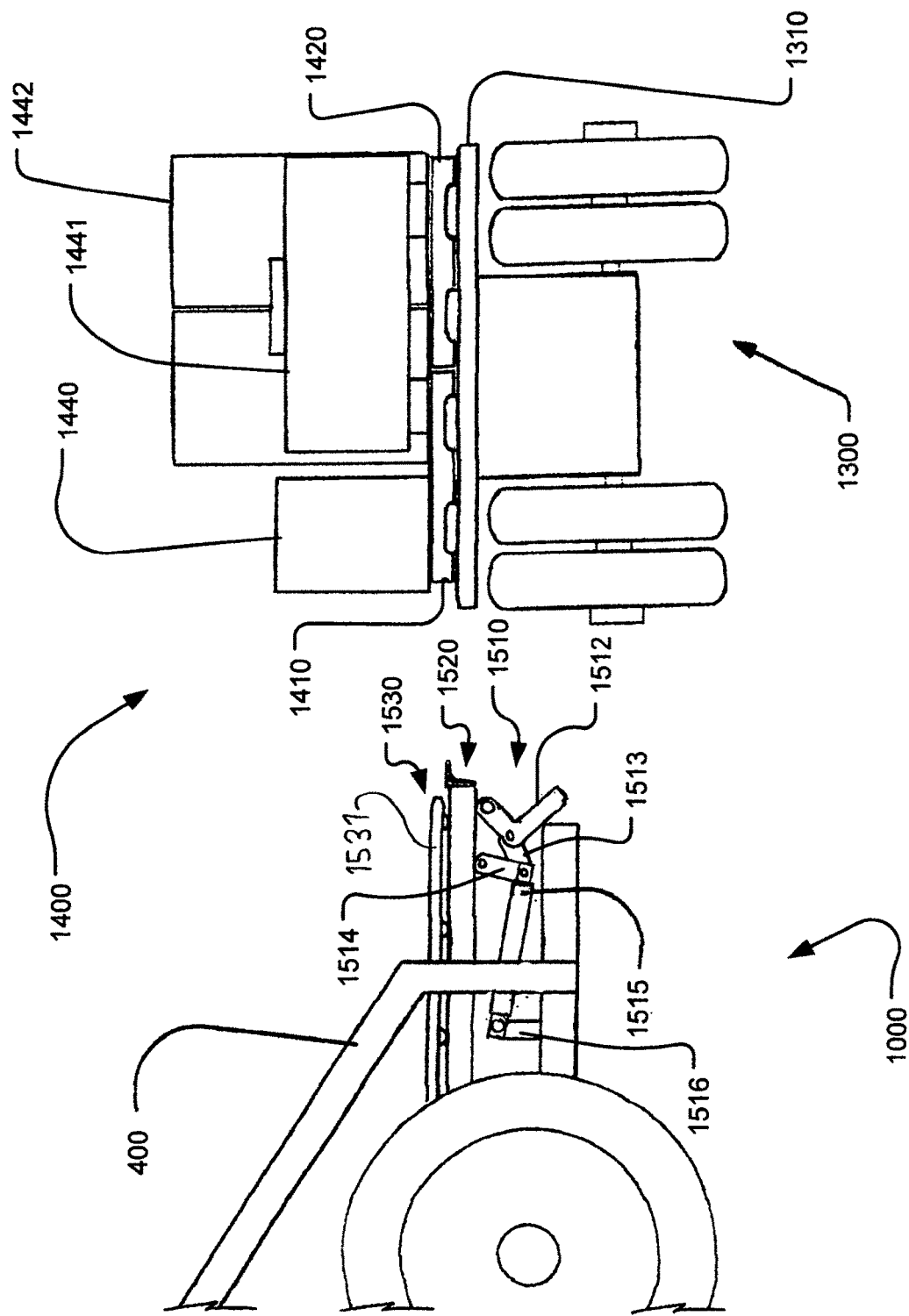
FIG. 27 illustrates a side elevation view of an embodiment that utilizes a type of integrated pallet fork mechanism instead of a consumables carriage abutting a flatbed truck containing pallets of consumables.
Figure 28:
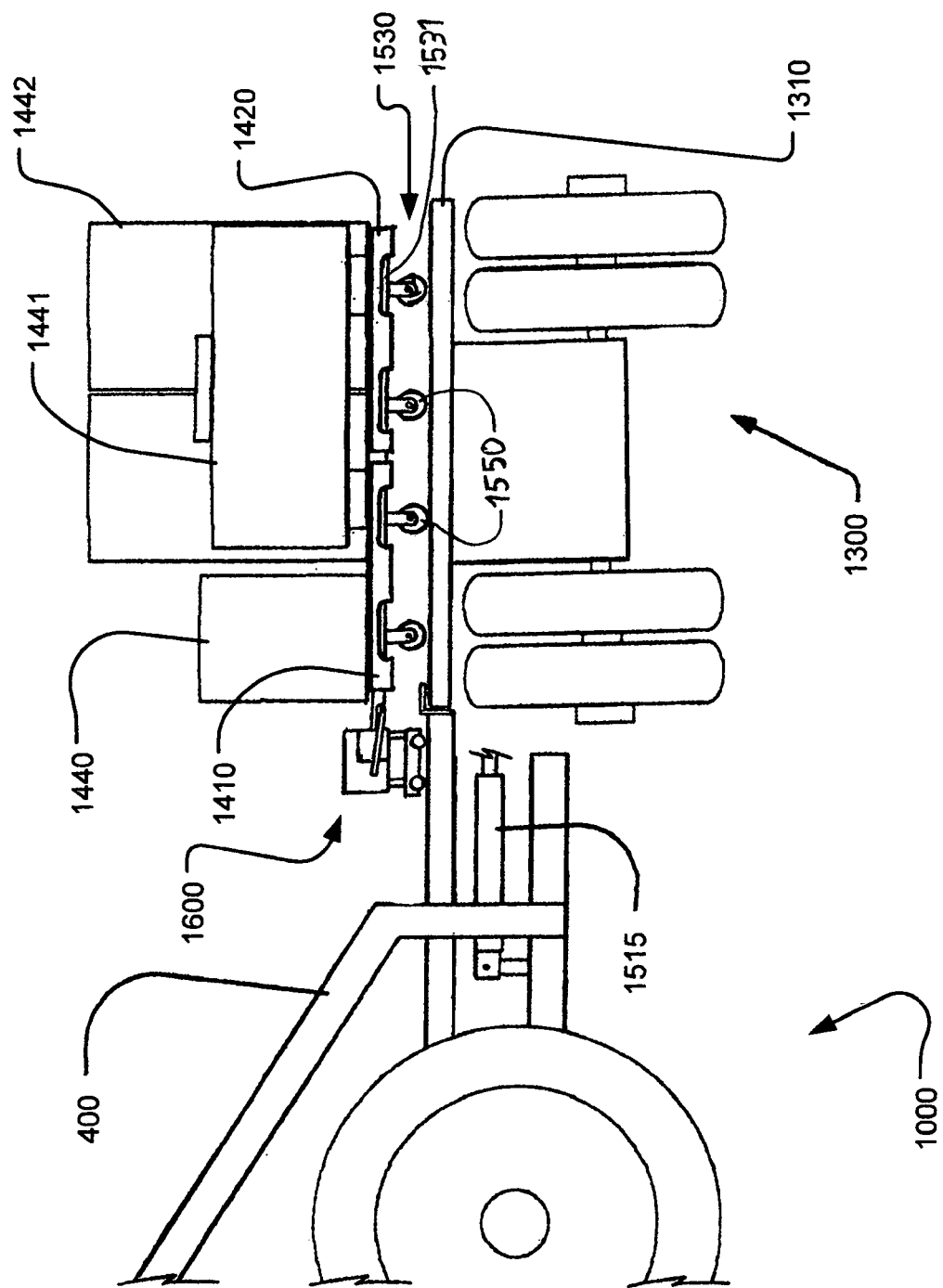
FIG. 28 illustrates the pallet fork mechanism lifting and moving two pallets from the truck to the tractor.
Figure 29:
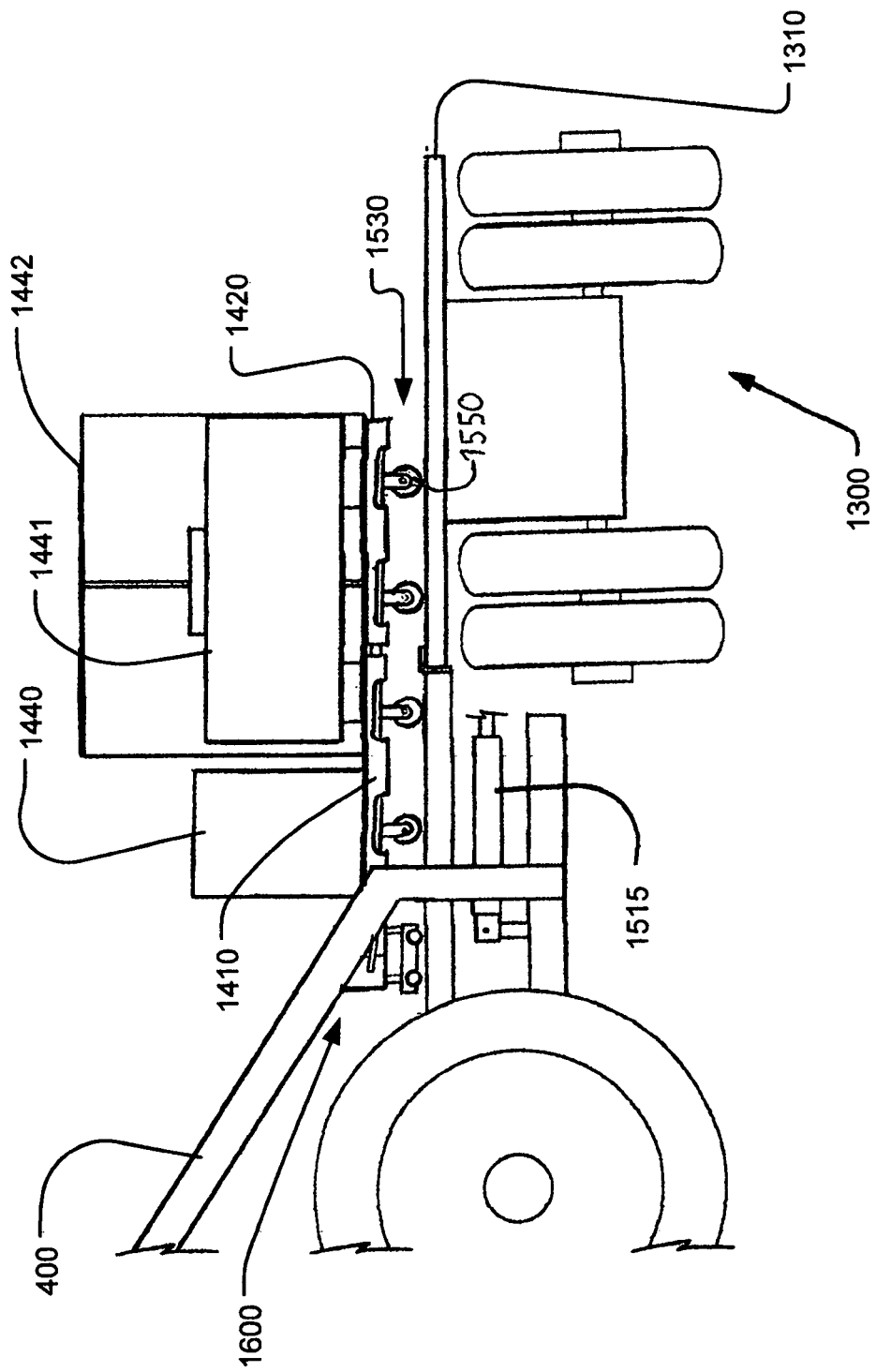
FIG. 29 illustrates the pallet fork mechanism lifting and moving two pallets from the truck to the tractor.
Figure 30:
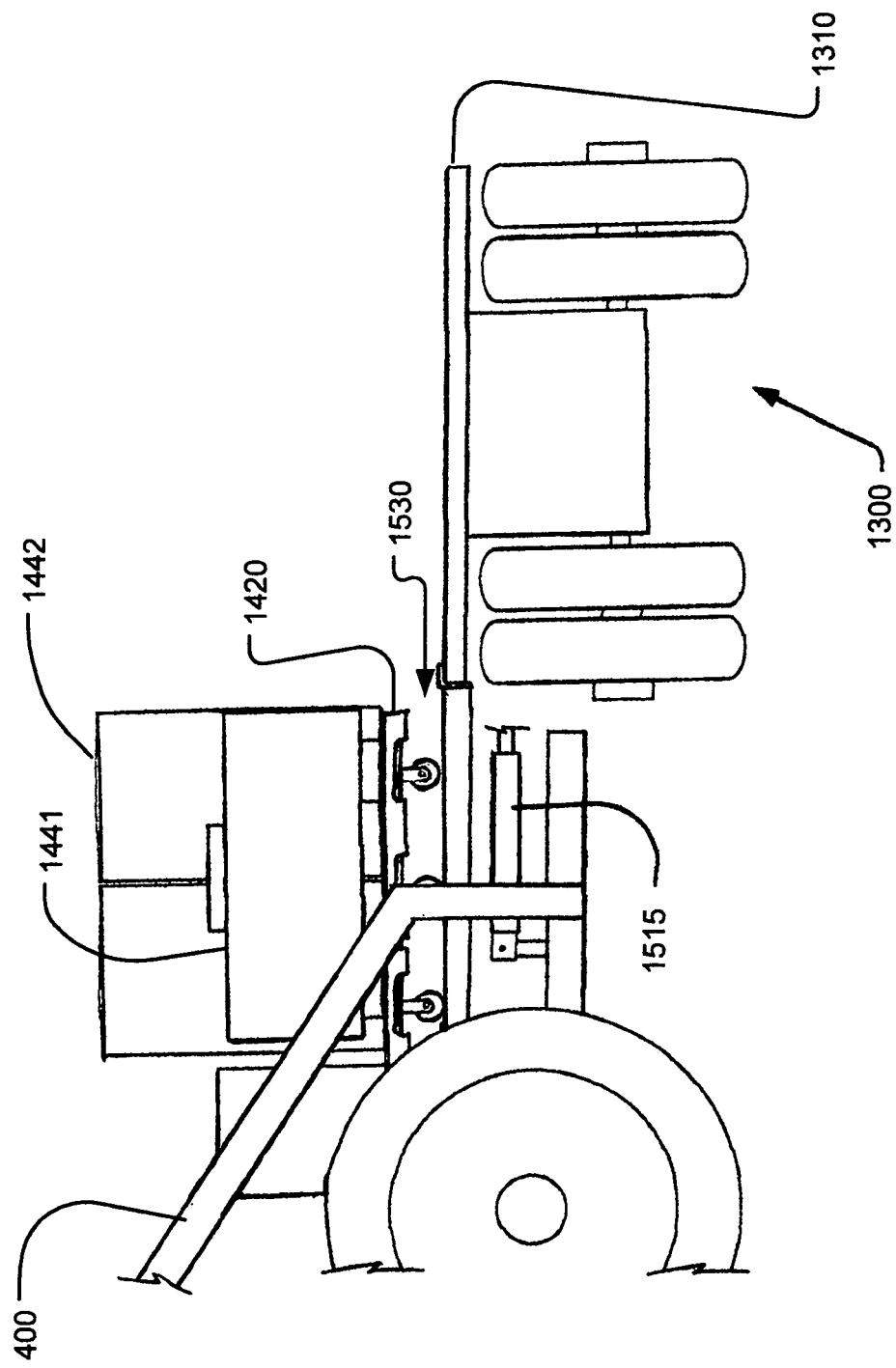
FIG. 30 illustrates the pallet fork mechanism lifting and moving two pallets from the truck to the tractor.
Figure 31:
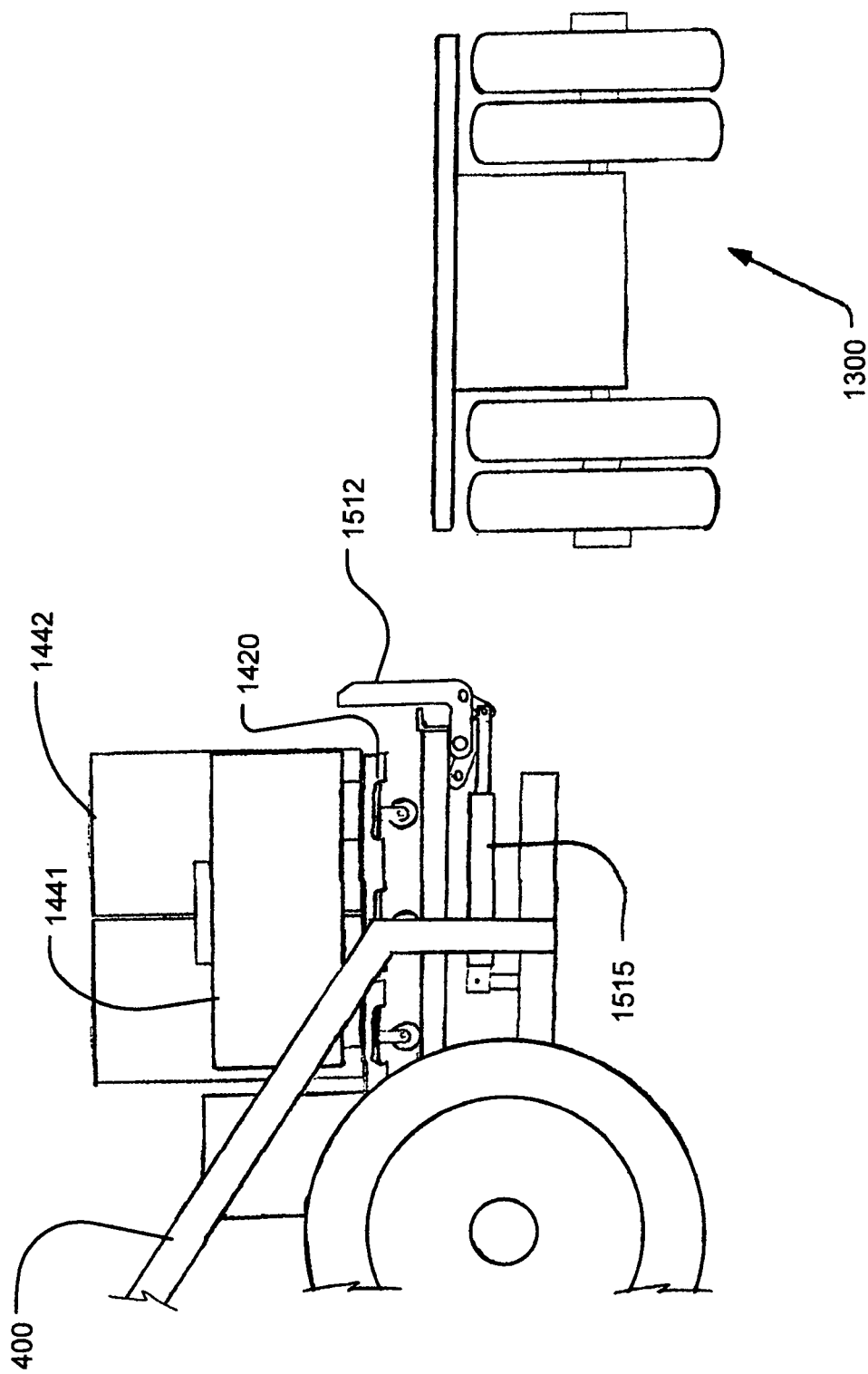
FIG. 31 illustrates the pallet fork mechanism in a stowed configuration with two pallets recently loaded onto the tractor.
Figure 32:
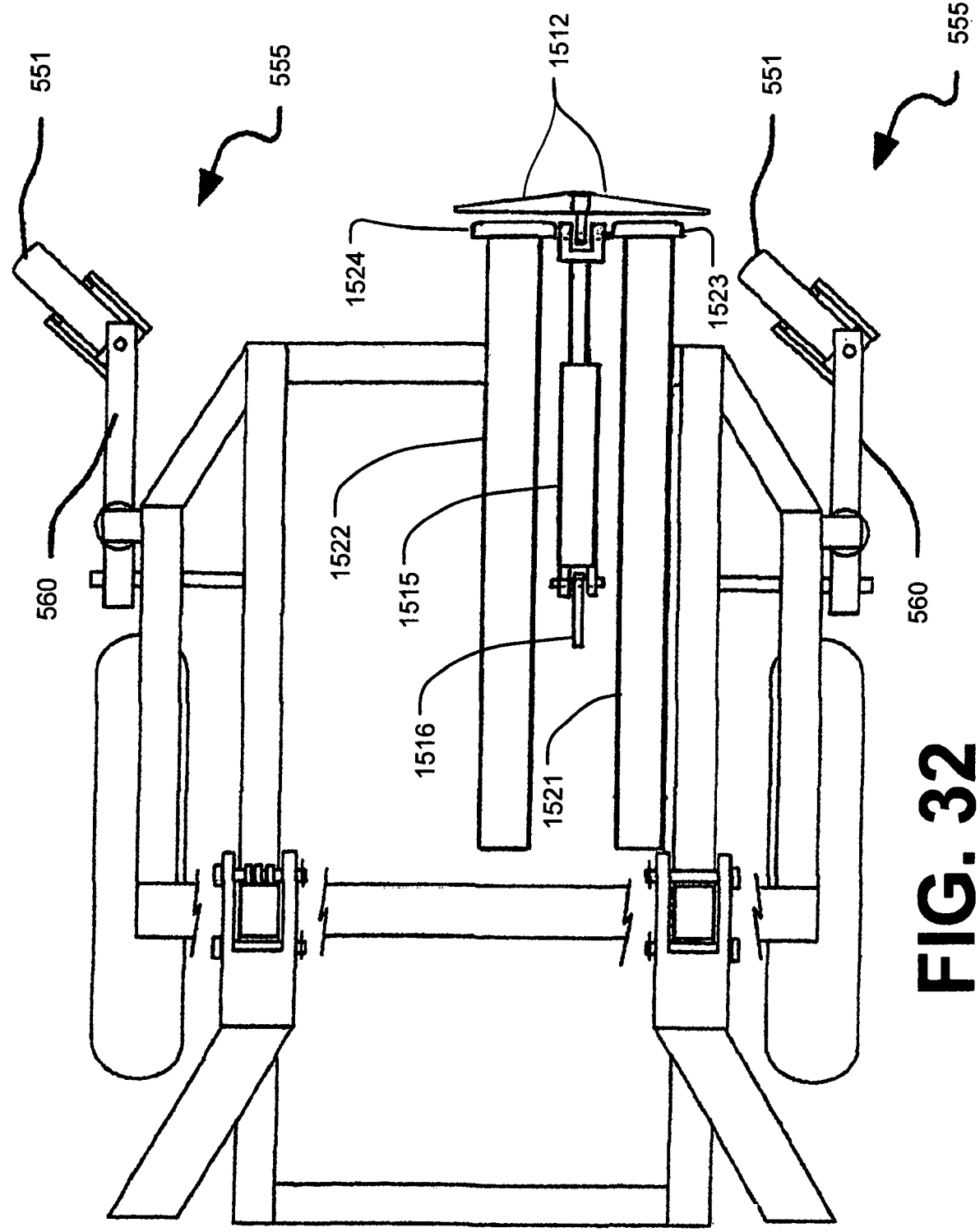
FIG. 32 is a top plan view illustrating the pallet fork mechanism.
Figure 33:
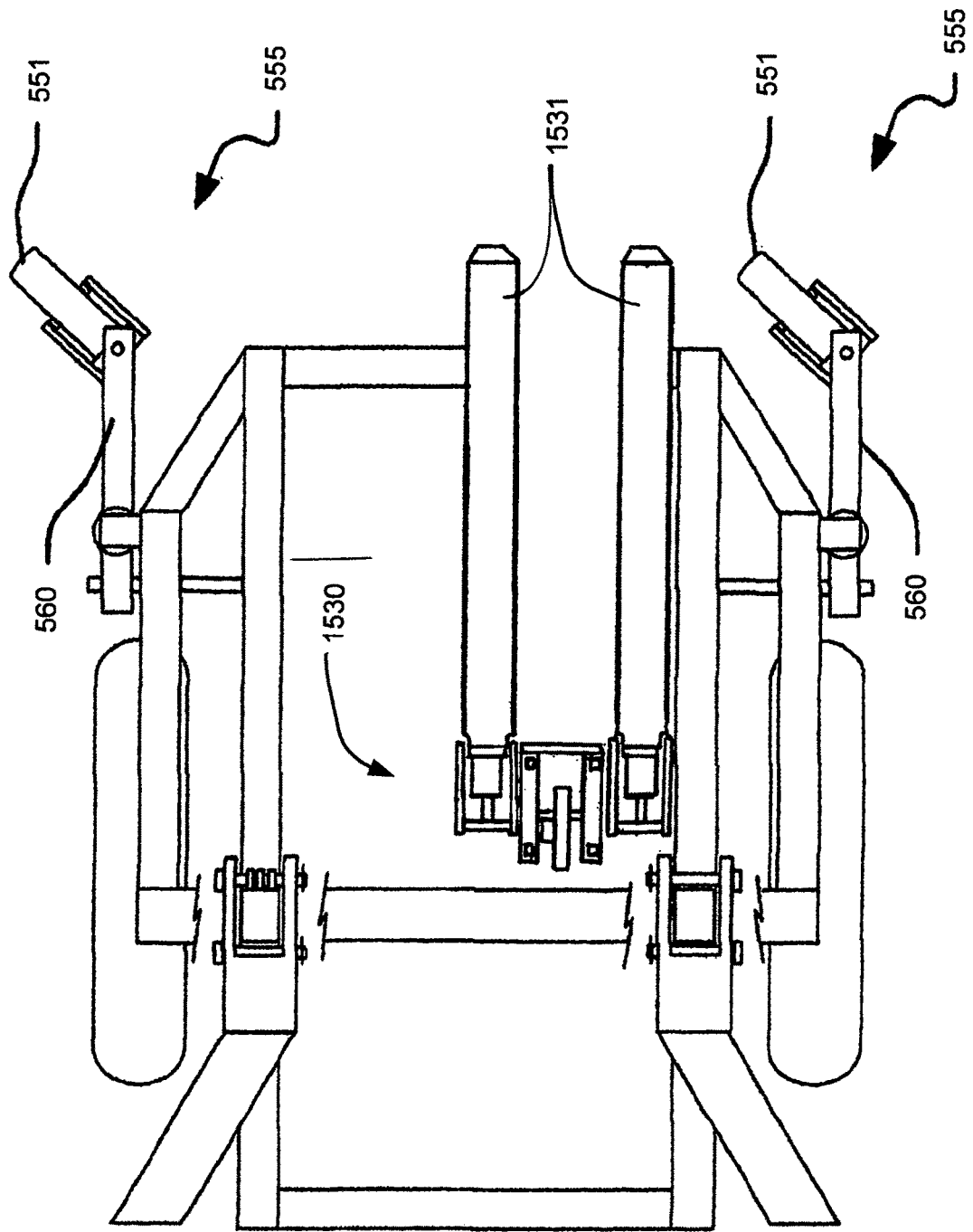
FIG. 33 is a top plan view illustrating the pallet fork mechanism.
Figure 34:
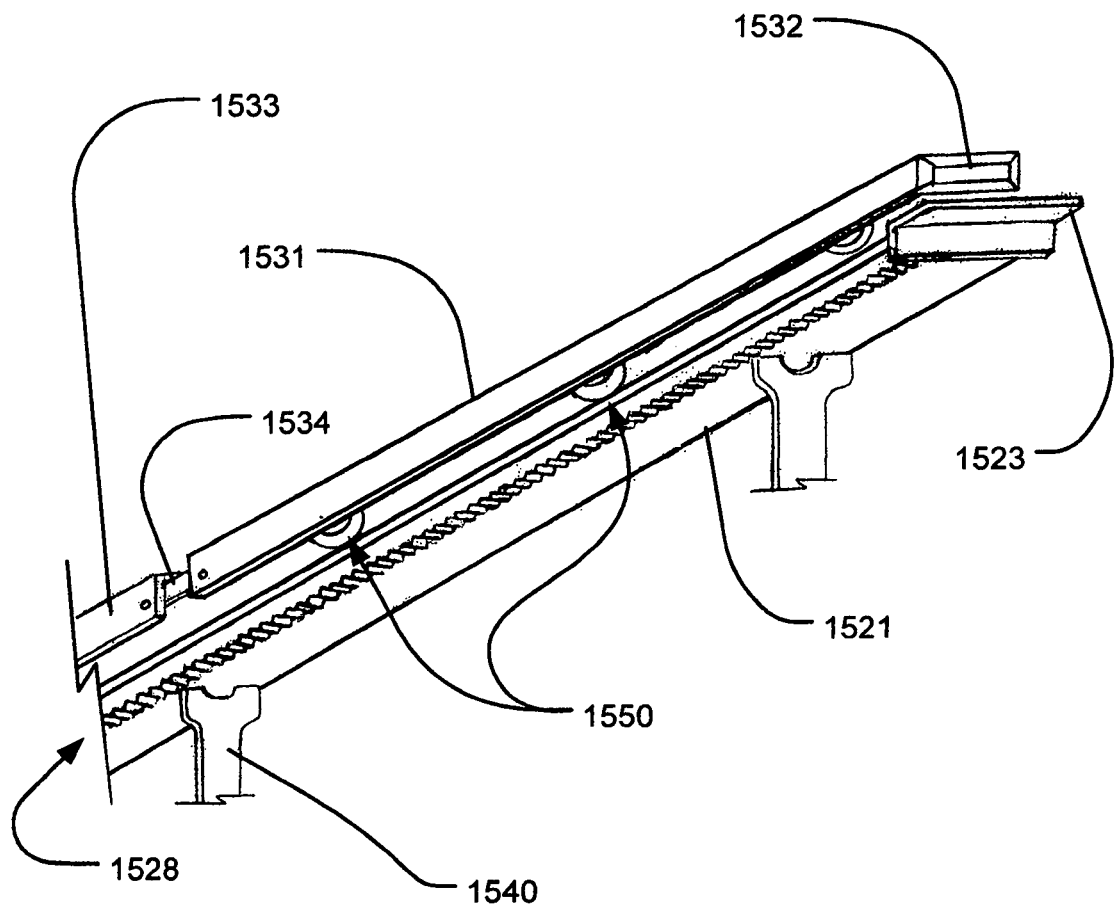
FIG. 34 illustrates components of the pallet fork mechanism.
Figure 35A:
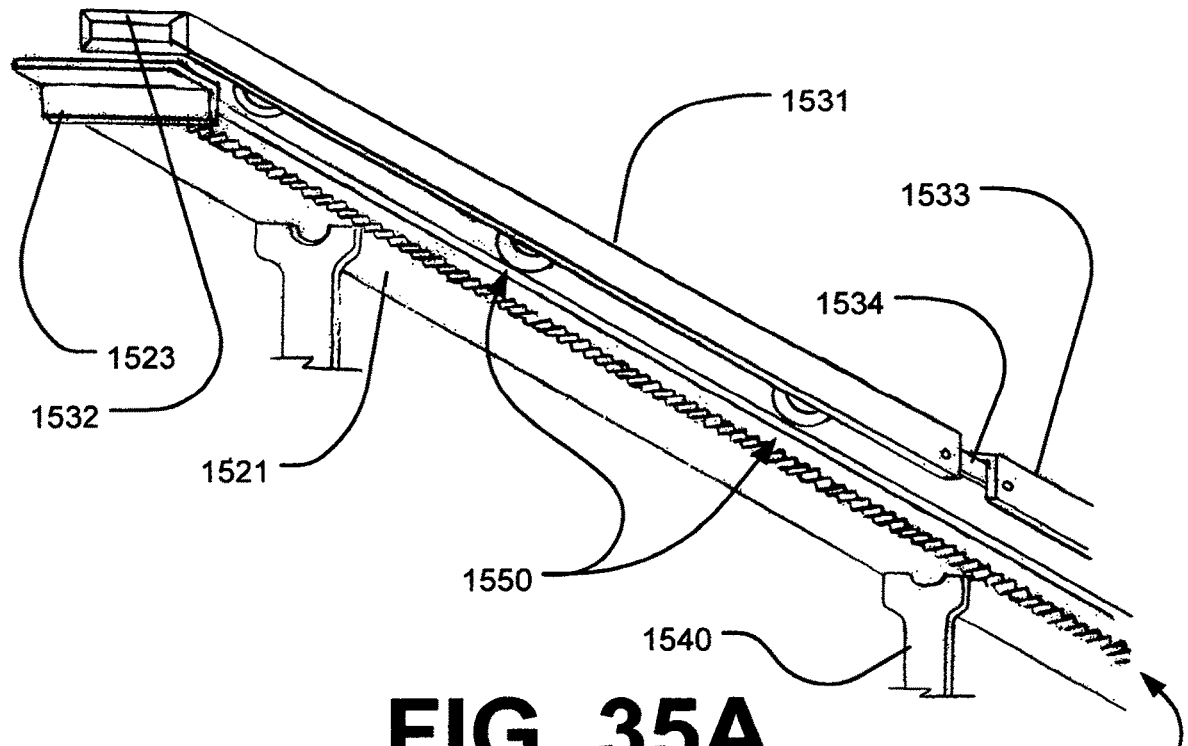
FIGS. 35A and 35B illustrate components of the pallet fork mechanism.
Figure 35B:
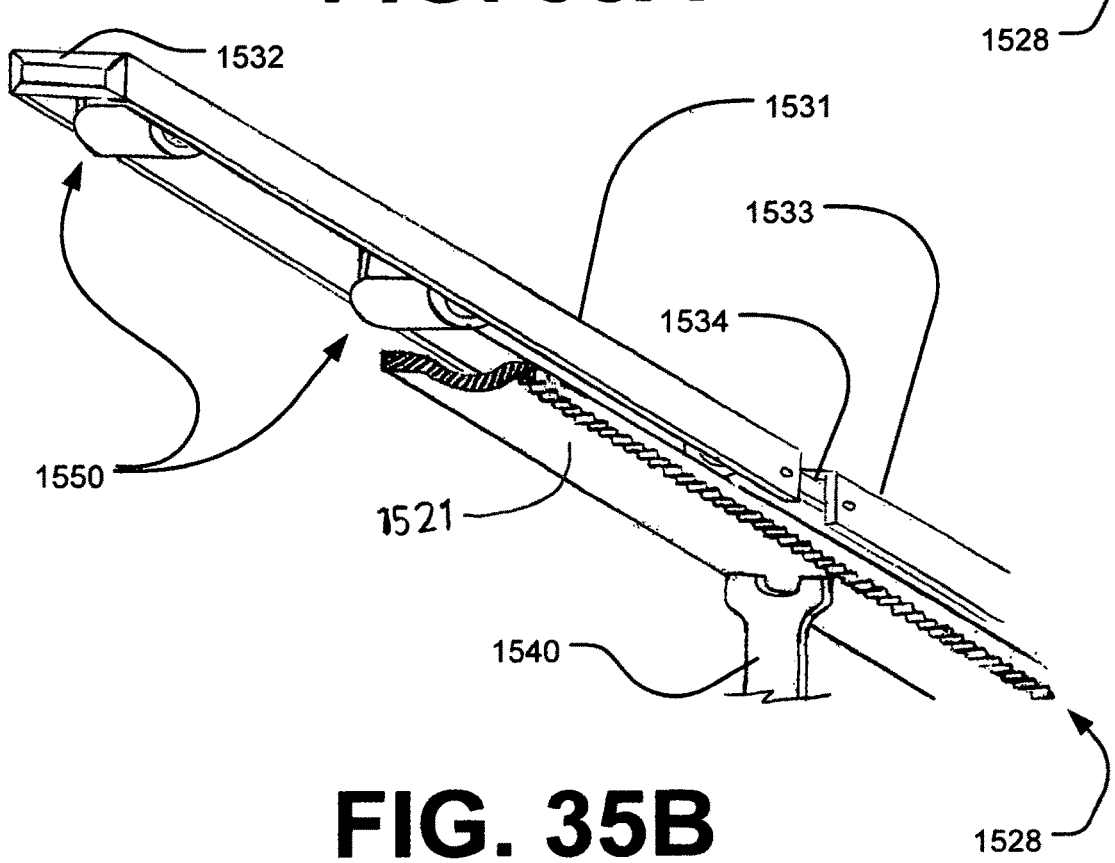
Figure 36A:
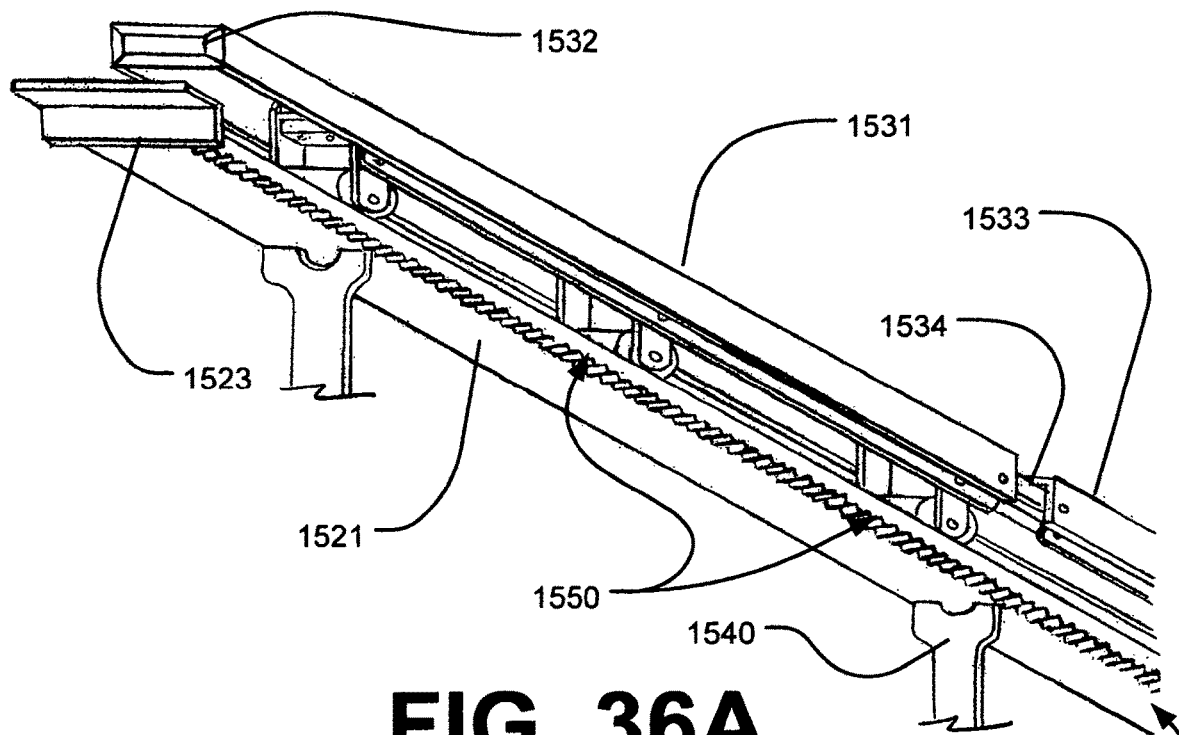
FIGS. 36A and 36B illustrate components of the pallet fork mechanism.
Figure 36B:
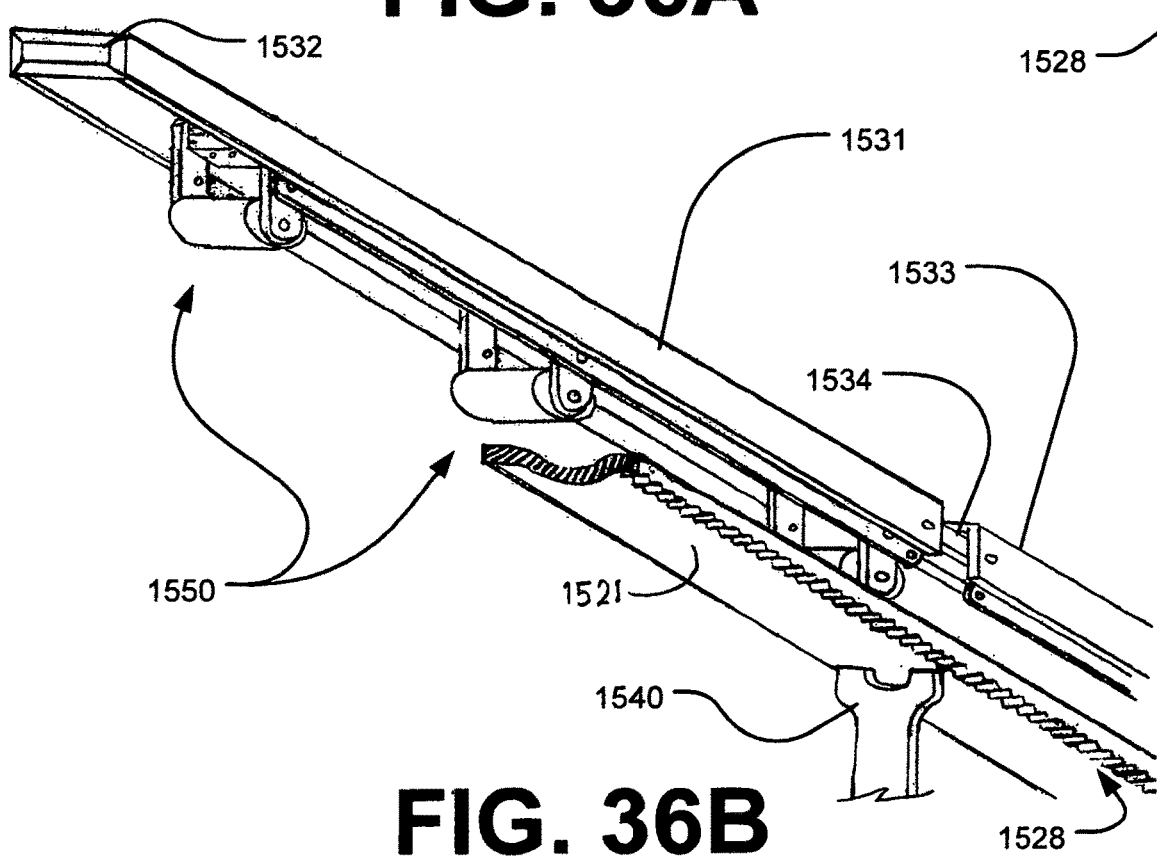
Figure 37A:
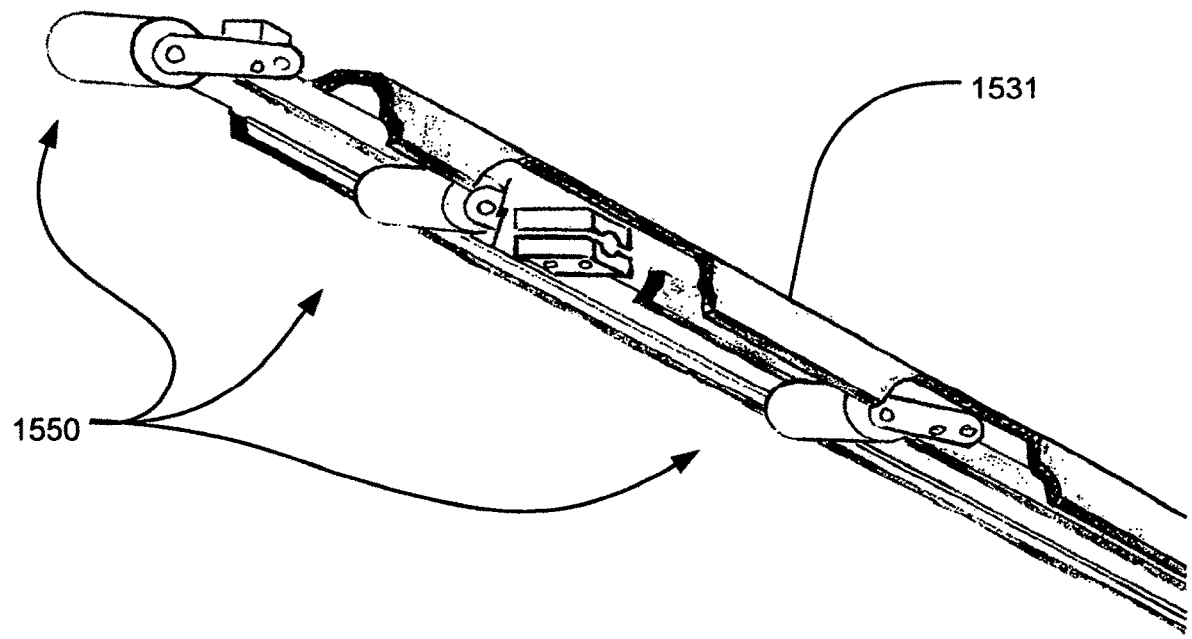
FIGS. 37A and 37B illustrate components of the pallet fork mechanism.
Figure 37B:
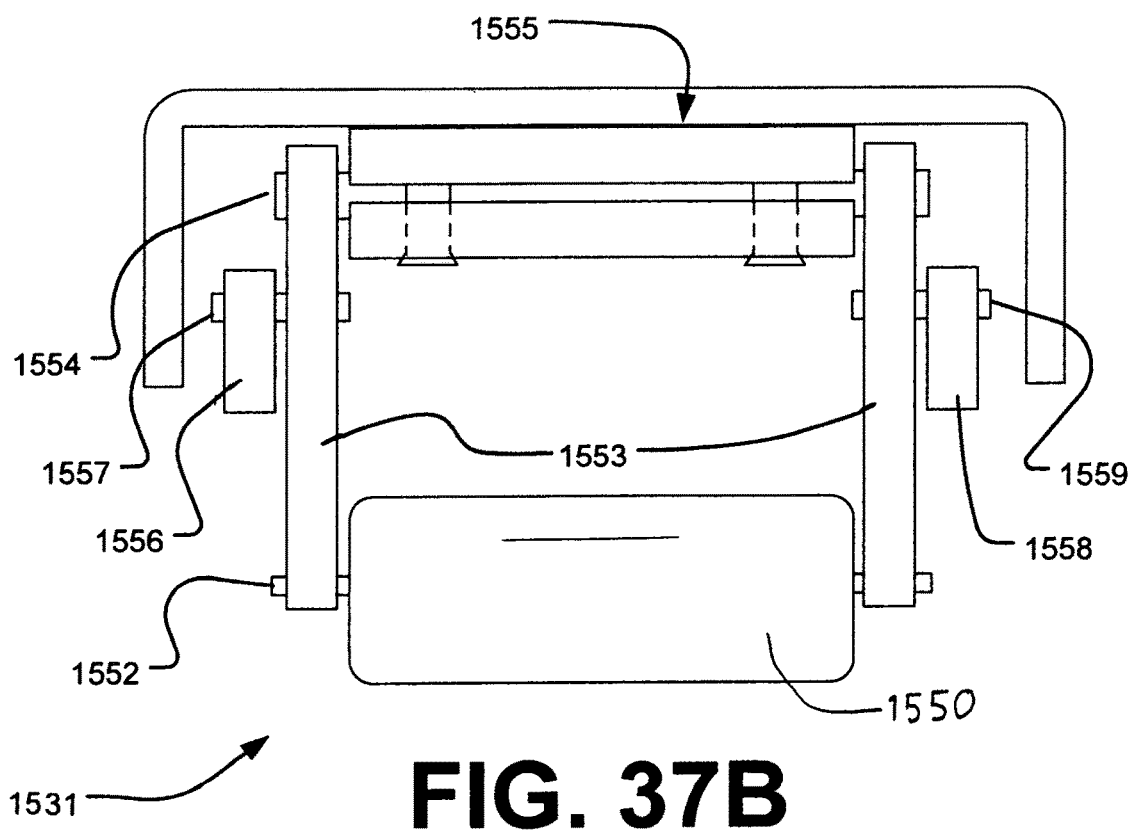

FIG. 26 illustrates a side elevation view of an embodiment that utilizes a type of integrated pallet fork mechanism instead of a consumables carriage approaching a flatbed truck containing pallets of consumables;

FIG. 27 illustrates a side elevation view of an embodiment that utilizes a type of integrated pallet fork mechanism instead of a consumables carriage abutting a flatbed truck containing pallets of consumables;

FIG. 28 illustrates the pallet fork mechanism lifting and moving two pallets from the truck to the tractor;

FIG. 29 illustrates the pallet fork mechanism lifting and moving two pallets from the truck to the tractor;

FIG. 30 illustrates the pallet fork mechanism lifting and moving two pallets from the truck to the tractor;

FIG. 31 illustrates the pallet fork mechanism in a stowed configuration with two pallets recently loaded onto the tractor;

FIG. 32 is a top plan view illustrating the pallet fork mechanism;

FIG. 33 is a top plan view illustrating the pallet fork mechanism;

FIG. 34 illustrates components of the pallet fork mechanism;

FIGS. 35A and 35B illustrate components of the pallet fork mechanism;

FIGS. 36A and 36B illustrate components of the pallet fork mechanism;

FIGS. 37A and 37B illustrate components of the pallet fork mechanism; and

Figure 38:
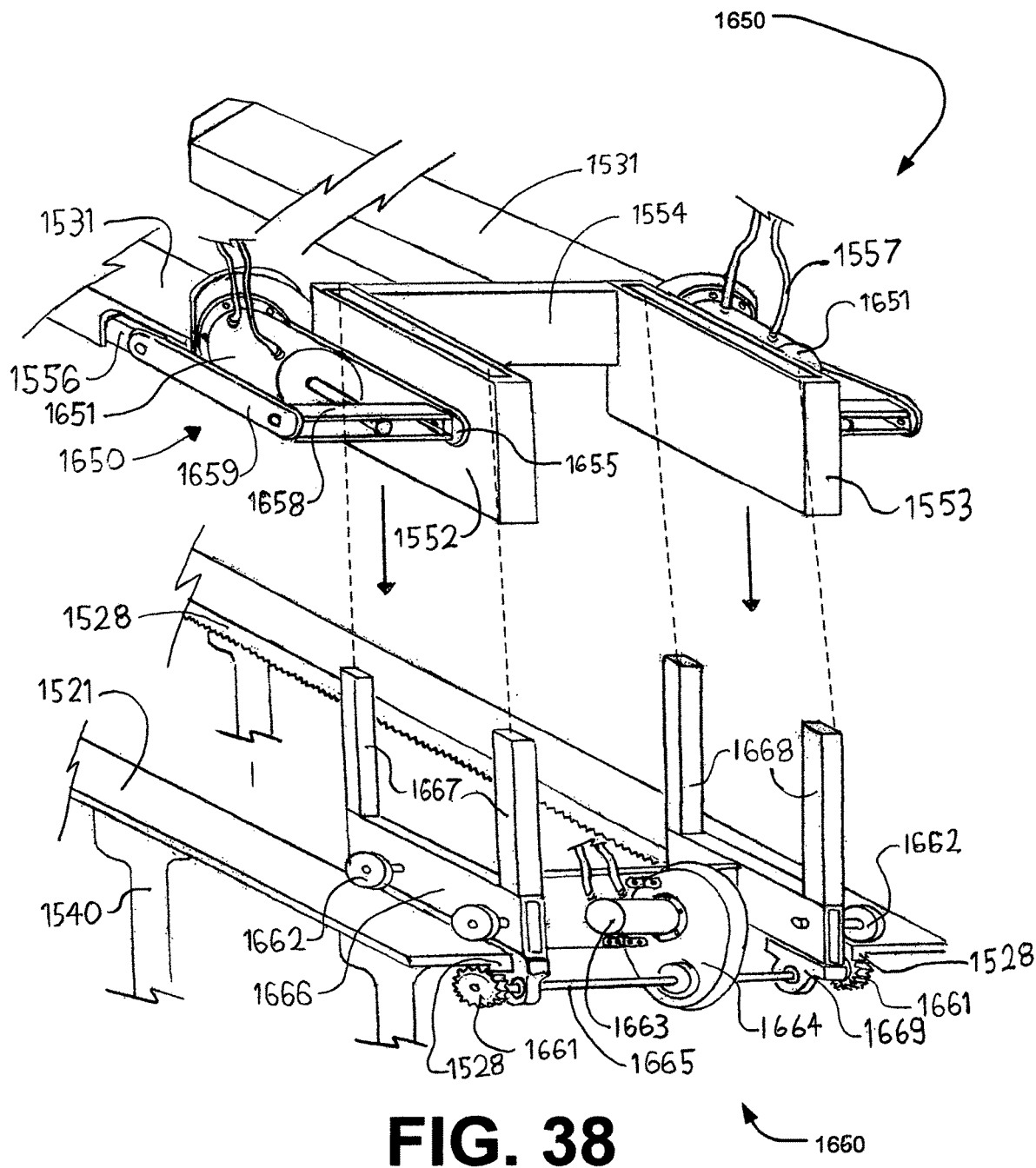
FIG. 38 illustrates components of the pallet fork mechanism.

FIG. 38 illustrates components of the pallet fork mechanism.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described systems, articles of manufacture and methods. It is important to note that many implementations can be made without departing from the spirit and scope of the disclosure.

What is claimed is:

1. A middle mounted implement tractor, comprising:
   a front frame assembly having a fixed forward frame assembly, a front wheel assembly, a left plurality of pivoting stabilizing arms and a right plurality of pivoting stabilizing arms;
   the front wheel assembly having a left front wheel assembly including a left front wheel and a right front wheel assembly including a right front wheel;
   a mounting frame assembly pivotably attached to the front frame assembly, the mounting frame assembly adapted to mount a middle mounted implement;
   wherein the front frame assembly is adapted to pivotably raise and lower relative to the mounting frame assembly such that the left and right front wheels can be raised and lowered relative to the mounting frame assembly;
   a movable frame assembly comprising the front frame assembly and the mounting frame assembly;
   a middle frame assembly movably attached to the mounting frame assembly and configured such that the movable frame assembly can be raised and lowered relative to the middle frame assembly;
   a rear frame assembly attached to the middle frame assembly and having a left rear wheel and a right rear wheel;

wherein the front wheel assembly pivots on a pivot point attached at a center of the fixed forward frame assembly;

a left plurality of weight bearing arms pivotably connects a fixed forward frame assembly left portion to a mounting frame assembly left portion and a right plurality of weight bearing arms pivotably connects a fixed forward frame assembly right portion to a mounting frame assembly right portion;

the left plurality of pivoting stabilizing arms are pivotably attached to the mounting frame assembly left portion and the right plurality of pivoting stabilizing arms are pivotably attached to the mounting frame assembly right portion;

wherein the mounting frame comprises a first implement attachment point and a second implement attachment point which are adapted to removably attach a middle mounted implement to the tractor;

the middle frame comprises a tractor cab, a plurality of dolly wheels, and a vertical frame attachment assembly adapted to vertically raise and lower the movable frame assembly relative to the middle frame;

wherein the rear frame further comprises a pallet fork assembly to allow loading and unloading of a loaded pallet or container with a pallet style base from a flatbed trailer onto the rear frame of the tractor;

the pallet fork assembly comprising: a pair of extended forks supported on a tractor mounted load bearing fixed track by load bearing rollers which can be hydraulically raised or lowered by a fork lifting mechanism;

a hydraulic mechanism utilized to move the pair of extended forks from a rear of the tractor along the load bearing fixed track onto a flat surface such as the bed of a trailer and then return to the rear of the tractor;

the fork lifting mechanism capable of raising or lowering the pair of extended forks when on the flat surface or when on the load bearing fixed track; and a load securing fence at the rear of the fixed track to secure the pair of extended forks and the loaded pallet or container with a pallet style base on the rear of the tractor.

2. The middle mounted implement tractor of claim 1, further comprising:

the left front wheel assembly further comprising a left spindle, a left rotating shaft fitted within a left wheel knee, and a left vertical extension;

the right front wheel assembly including a right spindle, a right rotating shaft fitted within a right wheel knee, and a right vertical extension;

the left plurality of stabilizing arms are pivotably connected to the left vertical extension and are adapted to keep the left wheel knee vertical; and the right plurality of stabilizing arms are pivotably connected to the right vertical extension and area adapted to keep the right wheel knee vertical.

3. The middle mounted implement tractor of claim 1, further comprising:

the left plurality of weight bearing arms pivotably attach to a left plurality of weight bearing arm attachment clevises on the fixed forward frame assembly left portion;

the right plurality of weight bearing arms pivotably attach to a right plurality of weight bearing arm attachment clevises on the fixed forward frame assembly right portion; and wherein the left and right pluralities of weight bearing arms are adapted to bear a weight of a front portion of the tractor and any middle mounted implement attached thereto.

4. The middle mounted implement tractor of claim 2, further comprising:

the left plurality of weight bearing arms pivotably attach to a left plurality of weight bearing arm attachment clevises on the fixed forward frame assembly left portion;

the right plurality of weight bearing arms pivotably attach to a right plurality of weight bearing arm attachment clevises on the fixed forward frame assembly right portion; and wherein the left and right pluralities of weight bearing arms are adapted to bear a weight of a front portion of the tractor and any middle mounted implement attached thereto.

5. The middle mounted implement tractor of claim 1, wherein the left front wheel and the right front wheel can turn one hundred and eighty degrees.

6. The middle mounted implement tractor of claim 2, wherein the left front wheel and the right front wheel can turn one hundred and eighty degrees.

7. The middle mounted implement tractor of claim 3, wherein the left front wheel and the right front wheel can turn one hundred and eighty degrees.

8. The middle mounted implement tractor of claim 4, wherein the left front wheel and the right front wheel can turn one hundred and eighty degrees.

9. The middle mounted implement tractor of claim 1, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

10. The middle mounted implement tractor of claim 2, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

11. The middle mounted implement tractor of claim 3, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

12. The middle mounted implement tractor of claim 4, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

13. The middle mounted implement tractor of claim 5, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

14. The middle mounted implement tractor of claim 6, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

15. The middle mounted implement tractor of claim 7, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

16. The middle mounted implement tractor of claim 8, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

17. A middle mounted implement tractor, comprising:
a front frame assembly pivotably connected to a mounting frame assembly;
a movable frame assembly comprising the front frame assembly and the mounting frame assembly;
a middle frame assembly movably attached to the mounting frame assembly and configured such that the movable frame assembly can be raised and lowered relative to the middle frame assembly;
a rear frame assembly attached to the middle frame assembly and having a left rear wheel and a right rear wheel;
the front frame assembly having a fixed forward frame assembly, a front wheel assembly, a left plurality of pivoting stabilizing arms and a right plurality of pivoting stabilizing arms;
the front wheel assembly having a left front wheel assembly including a left front wheel and a right front wheel assembly including a right front wheel;
wherein the front frame assembly is adapted to pivotably raise and lower relative to the mounting frame assembly such that the left and right front wheels can be raised and lowered relative to the mounting frame assembly;
wherein the front wheel assembly pivots on a pivot point attached at a center of the fixed forward frame assembly,
a left plurality of weight bearing arms pivotably connects a fixed forward frame assembly left portion to a mounting frame assembly left portion and a right plurality of weight bearing arms pivotably connects a fixed forward frame assembly right portion to a mounting frame assembly right portion;
the left plurality of pivoting stabilizing arms are pivotably attached to the mounting frame assembly left portion and the right plurality of pivoting stabilizing arms are pivotably attached to the mounting frame assembly right portion;
the mounting frame assembly further comprises a first implement attachment point and a second implement attachment point which are adapted to removably attach a middle mounted implement to the tractor;
the middle frame comprises a vertical frame attachment assembly adapted to vertically raise and lower the movable frame assembly relative to the middle frame;
the left wheel assembly further comprising a left front spindle, a left rotating shaft fitted within a left wheel knee, and a left vertical extension; the right front wheel assembly including a right front spindle, a right rotating shaft fitted within a right wheel knee, and a right vertical extension; the left plurality of stabilizing arms are pivotably connected to the left vertical extension and are adapted to keep the left wheel knee vertical; the right plurality of stabilizing arms are pivotably connected to the right vertical extension and area adapted to keep the right wheel knee vertical;
and wherein the rear frame further comprises a first caster wheel, a second caster wheel, and
a pallet fork assembly to allow loading and unloading of a loaded pallet or container with a pallet style base from a flatbed trailer onto the rear frame of the tractor;
the pallet fork assembly comprising: a pair of extended forks supported on a tractor mounted load bearing fixed track by load bearing rollers which can be hydraulically raised or lowered by a fork lifting mechanism;
a hydraulic mechanism utilized to move the pair of extended forks from a rear of the tractor along the load bearing fixed track onto a flat surface such as the bed of a trailer and then return to the rear of the tractor;
the fork lifting mechanism capable of raising or lowering the pair of extended forks when on the flat surface or when on the load bearing fixed track; and
a load securing fence at the rear of the fixed track to secure the pair of extended forks and the loaded pallet or container with a pallet style base on the rear of the tractor.

18. The middle mounted implement tractor of claim 17, further comprising:
the left plurality of weight bearing arms pivotably attach to a left plurality of weight bearing arm attachment clevises on the fixed forward frame assembly left portion;
the right plurality of weight bearing arms pivotably attach to a right plurality of weight bearing arm attachment clevises on the fixed forward frame assembly right portion; and
wherein the left and right pluralities of weight bearing arms are adapted to bear a weight of a front portion of the tractor and any middle mounted implement attached thereto.

19. The middle mounted implement tractor of claim 18, wherein the left front wheel and the right front wheel can turn one hundred and eighty degrees.

20. The middle mounted implement tractor of claim 19, wherein the vertical frame attachment assembly comprises a frame mover mechanism utilized to vertically raise and lower the movable frame relative to the middle frame, and wherein the frame mover mechanism is adapted to allow the movable frame to float upwards relative to the rest of the tractor when the middle mounted implement encounters an impediment.

* * * * *